（12）United States Patent
Burt et al.

(10) Patent No.: US 10,828,984 B2
(45) Date of Patent: Nov. 10, 2020

(54) CONTROL SYSTEM AND METHOD OF CONTROLLING A DRIVELINE

(71) Applicant: JAGUAR LAND ROVER LIMITED, Warwickshire (GB)

(72) Inventors: Sam Burt, Coventry (GB); Christopher Harries, Coventry (GB); Richard Clarke, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 0 days.

(21) Appl. No.: 16/174,971

(22) Filed: Oct. 30, 2018

(65) Prior Publication Data
US 2019/0070956 A1 Mar. 7, 2019

Related U.S. Application Data

(63) Continuation of application No. 15/527,354, filed as application No. PCT/EP2015/076982 on Nov. 18, 2015, now Pat. No. 10,160,316.

(30) Foreign Application Priority Data
Nov. 19, 2014 (GB) .................................. 1420544.7

(51) Int. Cl.
*B60K 23/08* (2006.01)
*B60K 17/35* (2006.01)
(Continued)

(52) U.S. Cl.
CPC ...... *B60K 23/0808* (2013.01); *B60K 17/3515* (2013.01); *B60K 23/08* (2013.01);
(Continued)

(58) Field of Classification Search
CPC ........ B60K 17/3515; B60K 2023/0858; B60K 2023/0891; B60K 23/0808;
(Continued)

(56) References Cited

U.S. PATENT DOCUMENTS

2008/0154629 A1* 6/2008 Breed .................. B60N 2/2863
705/1.1
2012/0029779 A1 2/2012 Dickinson et al.
(Continued)

FOREIGN PATENT DOCUMENTS

CN 102922994 A 2/2013
CN 103561988 A 2/2014
(Continued)

OTHER PUBLICATIONS

Combined Search and Examination Report under Sections 17 and 18(3) for Application No. GB1420544.7 dated Apr. 29, 2016.
(Continued)

*Primary Examiner* — Tinh Dang
(74) *Attorney, Agent, or Firm* — Carlson, Gaskey & Olds

(57) ABSTRACT

Some embodiments of the present invention provide a control system configured to control a driveline of a motor vehicle to operate in a selected one of a plurality of configurations, the system being configured to receive a signal indicative of a location of the vehicle, the system being configured to cause the driveline to operate in a configuration selected in dependence at least in part on the signal indicative of the location of the vehicle.

20 Claims, 7 Drawing Sheets

(51) Int. Cl.
- *B60W 10/10* (2012.01)
- *B60W 30/18* (2012.01)
- *B60W 30/02* (2012.01)
- *B60W 30/045* (2012.01)
- *B60W 10/18* (2012.01)
- *B60W 10/184* (2012.01)
- *B60W 30/182* (2020.01)
- *B60W 10/12* (2012.01)
- *B60W 10/14* (2012.01)
- *B60W 10/16* (2012.01)
- *B60W 10/20* (2006.01)
- *B60W 10/22* (2006.01)
- *B60W 10/119* (2012.01)

(52) U.S. Cl.
CPC .............. *B60K 2023/0858* (2013.01); *B60K 2023/0891* (2013.01); *B60W 2520/125* (2013.01)

(58) Field of Classification Search
CPC ... B60W 2520/125; B60W 2023/0858; B60W 2023/0891; B60W 10/10; B60W 10/18; B60W 10/184; B60W 10/12; B60W 10/14; B60W 10/16; B60W 10/20; B60W 10/22; B60W 10/119; B60W 30/182; B60W 30/045; B60W 30/18172; B60W 50/0097

See application file for complete search history.

(56) References Cited

U.S. PATENT DOCUMENTS

| | | |
|---|---|---|
| 2012/0245817 A1 | 9/2012 | Cooprider et al. |
| 2014/0067217 A1 | 3/2014 | Stares |
| 2014/0067219 A1 | 3/2014 | Stares et al. |
| 2014/0088833 A1 | 3/2014 | Matsuno et al. |
| 2014/0236443 A1 | 8/2014 | Rodrigues et al. |

FOREIGN PATENT DOCUMENTS

| | | |
|---|---|---|
| CN | 103847741 A | 6/2014 |
| CN | 104080680 A | 10/2014 |
| DE | 102012020906 A1 | 4/2014 |
| EP | 1355209 A1 | 10/2003 |
| EP | 2700551 A2 | 2/2014 |
| GB | 2418648 A | 4/2006 |
| GB | 2488528 A | 9/2012 |
| JP | 2008074229 A | 4/2008 |
| KR | 20150009670 A | 1/2015 |

OTHER PUBLICATIONS

International Search Report and Written Opinion of the International Searching Authority for International application No. PCT/EP2015/0769872 dated Mar. 7, 2016.

Chinese Search Report for Application No. 2015 80062388.0 dated Aug. 28, 2018.

* cited by examiner

CONTROL SYSTEM AND METHOD OF CONTROLLING A DRIVELINE

CROSS REFERENCE TO RELATED APPLICATION

This application is a continuation of U.S. patent application Ser. No. 15/527,354 dated May 17, 2017, which is the national phase application of PCT/EP2015/076982 dated Nov. 18, 2015, which claims priority to GB 1420544.7 dated Nov. 19, 2014.

INCORPORATION BY REFERENCE

The entire contents of co-pending UK patent application GB1202427.9 (publication number GB2499252), UK patents GB2325716, GB2308415, GB2341430, GB2382158, GB2492748, GB2492655 and GB2381597 and US2003/0200016 are expressly incorporated herein by reference.

FIELD OF THE INVENTION

The present disclosure relates to a control system and a method of controlling a driveline, for example a motor vehicle driveline. In particular, but not exclusively, aspects of the invention relate to drivelines of motor vehicle such as all-terrain vehicles (ATVs) having a driveline that is operable to change the number of wheels that provide torque to drive the vehicle.

BACKGROUND

It is known to provide a motor vehicle having a four wheel drive mode of operation in which motive power is supplied to each of two pairs of wheels of the vehicle. Each pair of wheels may be considered to form part of an axle, the vehicle having a front axle and a rear axle. Motive power is supplied to the wheels by means of a driveline.

Some known vehicles are arranged such that motive power is permanently supplied to both axles. Some other vehicles are arranged such that motive power is selectively supplied to either only one axle or to both axles. A driver operable selector may be provided to allow the driver to select two wheel (single axle) and four wheel (two axle) operation.

Some driveline systems require the vehicle to be stationary when transitioning between two and four wheel drive modes. Such systems may be referred to as static disconnect/reconnect systems.

GB2407804 discloses a dynamic driveline reconnect arrangement in which reconnection of the wheels of one axle to the driveline following disconnection of the wheels of that axle may be undertaken when the vehicle is moving. Such a system may be referred to as a dynamic driveline reconnect system. The system disclosed in GB2407804 employs clutch arrangements to enable dynamic driveline reconnection.

In some known dynamic driveline reconnect systems the vehicle is operable automatically to disconnect the driveline from two of the wheels when a prescribed condition is met so that the vehicle operates in a two wheel drive mode. The system automatically reconnects the driveline to enable four wheel drive operation when the prescribed condition is not met.

It is an aim of embodiments of the present invention to at least partially mitigate the disadvantages of known dynamic driveline systems.

STATEMENT OF THE INVENTION

Aspects and embodiments of the invention may be understood by reference to the appended claims.

Aspects of the invention provide a control system, a driveline, a powertrain, a motor vehicle, a method, a carrier medium, a computer program product, a computer readable medium and a processor.

In one aspect of the invention for which protection is sought there is provided a control system configured to control a driveline of a motor vehicle to operate in a selected one of a plurality of configurations, the system being configured to receive a signal indicative of a location of the vehicle, the system being configured to cause the driveline to operate in a configuration selected in dependence at least in part on the signal indicative of the location of the vehicle.

In some embodiments the system may be configured to receive a signal that indicates a geographical location, for example with respect to earth latitude and longitude coordinates. The system may be configured to subsequently determine whether the location is a location requiring operation of the driveline in a particular configuration. The system may make this determination by reference to map data. Alternatively, the system may be configured to receive a signal indicative of the type of location. For example, in some embodiments the system may be configured to receive a signal indicative whether the vehicle is operating (driving) on-road or off-road. In the case the vehicle is operating on-road the signal may indicate whether the vehicle is operating in an urban environment, e.g. whether the vehicle is operating within an outer boundary of a town or city. In the case the vehicle is operating on a motorway the system may indicate that the vehicle is operating on a motorway. Other arrangements may be useful in some embodiments.

The control system may comprise one or more electronic controllers.

It is to be understood that the controller or controllers described herein may comprise a control unit or computational device having one or more electronic processors. The system may comprise a single control unit or electronic controller or alternatively different functions of the controller may be embodied in, or hosted in, different control units or controllers. As used herein the term "control unit" will be understood to include both a single control unit or controller and a plurality of control units or controllers collectively operating to provide the stated control functionality. A set of instructions could be provided which, when executed, cause said computational device to implement the control techniques described herein. The set of instructions could be embedded in said one or more electronic processors. Alternatively, the set of instructions could be provided as software to be executed on said computational device. The controller may be implemented in software run on one or more processors. One or more other controllers may be implemented in software run on one or more processors, optionally the same one or more processors as the controller. Other arrangements may be useful in some embodiments.

The control system may be configured to cause the driveline to operate in a first configuration in which the driveline is configured such that a first group of one or more wheels and in addition a second group of one or more wheels are arranged to be driven or a second configuration in which the first group of one or more wheels and not the second group are arranged to be driven.

The vehicle may have a driveline arranged to drive two groups each of two wheels, the first configuration corresponding to a four wheel drive mode of operation and the second configuration corresponding to a two wheel drive mode of operation.

The control system may be configured to cause the driveline to operate in the first configuration if the signal indicative of location indicates the vehicle is operating off-road.

The control system may be configured to cause the driveline to operate in the second configuration if the signal indicative of location indicates the vehicle is operating on-road.

It is to be understood that the control system may cause the driveline to operate in the first configuration even when operating on-road, in dependence on one or more further parameters such as vehicle speed, surface coefficient of friction between wheels of the vehicle and a driving surface, and/or one or more further parameters.

The control system may be configured to predict an amount of lateral acceleration that will be experienced by the vehicle in dependence at least in part on a predicted path of travel of the vehicle, the system being configured to cause the driveline to operate in a predetermined one of the plurality of configurations in dependence at least in part on the predicted amount of lateral acceleration.

Optionally, the first or second group of one or more wheels comprises a plurality of wheels, the system being configured to set a predetermined amount of locking torque between at least a pair of wheels of the plurality of wheels of the first or second group in dependence at least in part on the predicted amount of lateral acceleration.

The first or second group of one or more wheels may comprise a plurality of wheels, the system being configured to set a predetermined amount of locking torque between at least a pair of wheels of the plurality of wheels of the first group and/or at least a pair of wheels of the plurality of wheels of the second group in dependence at least in part on the predicted amount of lateral acceleration.

The predetermined amount of locking torque may be substantially a fixed amount of locking torque, for example a maximum amount that may be developed. By locking torque is meant the difference in the amount of torque that must be applied between at least a pair of wheels in order to cause relative rotation of the wheels. The locking torque may be a cross-axle locking torque between wheels of a given axle. Alternatively the locking torque may be an inter-axle locking torque between wheels of respective axles.

The control system may be configured to set a predetermined amount of locking torque between at least one wheel of the first group and at least one wheel of the second group in dependence at least in part on the predicted amount of lateral acceleration.

The control system may be configured to determine the amount of lateral acceleration that will be experienced at least in part in dependence on a radius of curvature of the predicted path of travel.

The system may be configured to detect bends in a path of travel, for example by calculating a radius of curvature of the path of travel. The system may be configured to cause the driveline to operate in a predetermined one of the plurality of configurations in dependence at least in part on the predicted radius of curvature. The system may be configured to determine a predicted amount of lateral acceleration the vehicle will experience in dependence at least in part on the predicted radius of curvature and optionally a speed of travel of the vehicle.

The control system may be configured to compare the predicted amount of lateral acceleration with a threshold lateral acceleration value and to cause the driveline to operate in a predetermined one of the plurality of configurations in dependence at least in part on whether the predicted amount of lateral acceleration exceeds the threshold value.

Optionally, the threshold lateral acceleration value is determined at least in part in dependence on at least one selected from amongst vehicle speed, one or more characteristics of a road wheel of the vehicle and data in respect of one or more environmental conditions.

The data in respect of one or more environmental conditions may include weather data, which may include forecast weather and/or observed weather. The data may include data in respect of whether rain is present, for example data generated in dependence on a signal from a rain sensor of the vehicle, and/or data generated in dependence on whether a windscreen wiper is active or has been active within a predetermined time period. In addition or instead the data may include data generated by a temperature sensor such as an ambient temperature sensor.

The control system may be configured to determine whether a bend exists in a predicted path of travel of the vehicle, the system being configured to cause the driveline to operate in a predetermined one of the plurality of configurations in dependence at least in part on whether a bend exists in the predicted path of travel.

The control system may be configured to cause the driveline to operate in a predetermined one of the plurality of configurations in dependence at least in part on whether a bend is detected having a radius of curvature less than a predetermined value.

In some embodiments the system may cause the driveline to operate in the first configuration if a bend having a radius of curvature less than a predetermined value is detected. The predetermined value may be any suitable value, for example a value less than 300 m, 200 m, 100 m or any other suitable value. The predetermined value may be in the range from 1 m to 300 m, 1 m to 200 m, 1 m to 100 m or any other suitable range.

Optionally, the predetermined value of bend radius is dependent at least in part on a speed of travel of the vehicle. The predetermined value may be arranged to decrease with increasing vehicle speed in some embodiments.

The control system may be configured to cause the driveline to operate in the first configuration if it is determined that a bend exists in the predicted path of travel.

The control system may be configured to set an amount of locking torque between wheels of the first and/or second group, and/or between at least one wheel of the first group and at least one wheel of the second group, at least in part in dependence on whether a bend exists in the predicted path of travel.

In some embodiments the system may cause the driveline to operate in the first configuration if it is determined that a bend exists in the predicted path of travel having a radius of curvature less than the predetermined value. Similarly, an amount of locking torque may be set in dependence on whether a bend exists in the predicted path of travel having a radius of curvature less than the predetermined value.

The control system may be configured to configured to cause the driveline to operate in a predetermined one of the plurality of configurations in dependence at least in part on whether a bend exists in the predicted path of travel when the vehicle is operating on-road.

The control system may be configured to cause the driveline to operate in a configuration selected at least in part in further dependence on a signal indicative of a selected driving mode in which the vehicle is operating, the driving mode being selected from a plurality of driving modes.

Optionally the signal indicative of the driving mode in which the vehicle is operating corresponds to a state of a manual driving mode selector input device or a signal indicative of a driving mode selected automatically by automatic driving mode selection means.

The control system may have a subsystem controller for initiating control of at least one vehicle subsystem in a selected one of a plurality of subsystem configuration modes of that system, the subsystem configuration mode being selected in dependence on the selected driving mode.

Optionally the driving modes correspond to respective different driving conditions for a vehicle.

In some embodiments the driving modes correspond to different types of terrain over which a vehicle may drive. For example one driving mode may be suitable for driving over relatively soft, slippery terrain such as grass, gravel or snow. Another driving mode may be suitable for travel over muddy or rutted terrain. A still further driving mode may be suitable for travel over rocky terrain and yet another may be suitable for travel over relatively smooth, non-slippery terrain such as on-road.

Optionally, in each driving mode the system is configured to cause the at least one vehicle subsystem to be operated in a subsystem configuration mode appropriate to the driving condition.

Optionally, each driving mode has a corresponding subsystem configuration mode of at least one vehicle subsystem selected from amongst an engine management system, a transmission system, a steering system, a brakes system and a suspension system.

Optionally, the subsystem configuration modes of at least one driving mode are selected from amongst:

a subsystem configuration mode of a suspension system, the plurality of subsystem configuration modes of the suspension system comprising a plurality of ride heights; a subsystem configuration mode of a fluid suspension system in which fluid interconnection can be made between suspensions for wheels on opposite sides of the vehicle, the plurality of subsystem configuration modes of the fluid suspension system providing different levels of said interconnection;

a subsystem configuration mode of a steering system which can provide steering assistance, the plurality of subsystem configuration modes of the steering system providing different levels of said steering assistance;

a subsystem configuration mode of a brakes system which can provide braking assistance, the plurality of subsystem configuration modes of the brakes system providing different levels of said braking assistance;

a subsystem configuration mode of a brake control system which can provide an anti-lock function to control wheel slip, the plurality of subsystem configuration modes of the brake control system allowing different levels of said wheel slip;

a subsystem configuration mode of a powertrain system which includes a powertrain control means and an accelerator or throttle pedal, the subsystem configuration modes of the powertrain system providing different levels of responsiveness of the powertrain control means to movement of the accelerator or throttle pedal;

a subsystem configuration mode of a traction control system which is arranged to control wheel spin, the plurality of subsystem configuration modes of the traction control system allowing different levels of said wheel spin;

a subsystem configuration mode of a yaw control system which is arranged to control vehicle yaw, the plurality of subsystem configuration modes of the yaw control system allowing different levels of divergence of said vehicle yaw from an expected yaw;

a subsystem configuration mode of a range change transmission, the subsystem configuration modes of the range change transmission including a high range mode and a low range mode of said transmission; and a subsystem configuration mode of a transmission system operable in a plurality of transmission ratios and including a transmission control means arranged to monitor at least one parameter of the vehicle and to select the transmission ratios in response, the subsystem configuration modes of the transmission system including a plurality of transmission configuration modes in which the transmission ratios are selected differently in response to said at least one parameter.

In a further aspect of the invention for which protection is sought there is provided a driveline in combination with a system according to another aspect.

In an aspect of the invention for which protection is sought there is provided a powertrain comprising a driveline and a system according to another aspect.

In one aspect of the invention for which protection is sought there is provided a motor vehicle comprising a driveline and a system according to another aspect.

In a further aspect of the invention for which protection is sought there is provided a motor vehicle comprising a body, a plurality of wheels, a powertrain to drive said wheels, the powertrain comprising a driveline, a braking system to brake said wheels, and a system according to another aspect.

In one aspect of the invention for which protection is sought there is provided a method of controlling a driveline of a motor vehicle to operate in a selected one of a plurality of configurations, the method comprising:

receiving a signal indicative of a location of the vehicle, and causing the driveline to operate in a configuration selected in dependence at least in part on the signal indicative of the location of the vehicle.

In one aspect of the invention for which protection is sought there is provided a carrier medium carrying computer readable code for controlling a vehicle to carry out the method of another aspect.

In one aspect of the invention for which protection is sought there is provided a computer program product executable on a processor so as to implement the method of another aspect.

In one aspect of the invention for which protection is sought there is provided a computer readable medium loaded with the computer program product of another aspect.

In one aspect of the invention for which protection is sought there is provided a processor arranged to implement the method of another aspect.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying figures in which.

DETAILED DESCRIPTION

Figure 1:
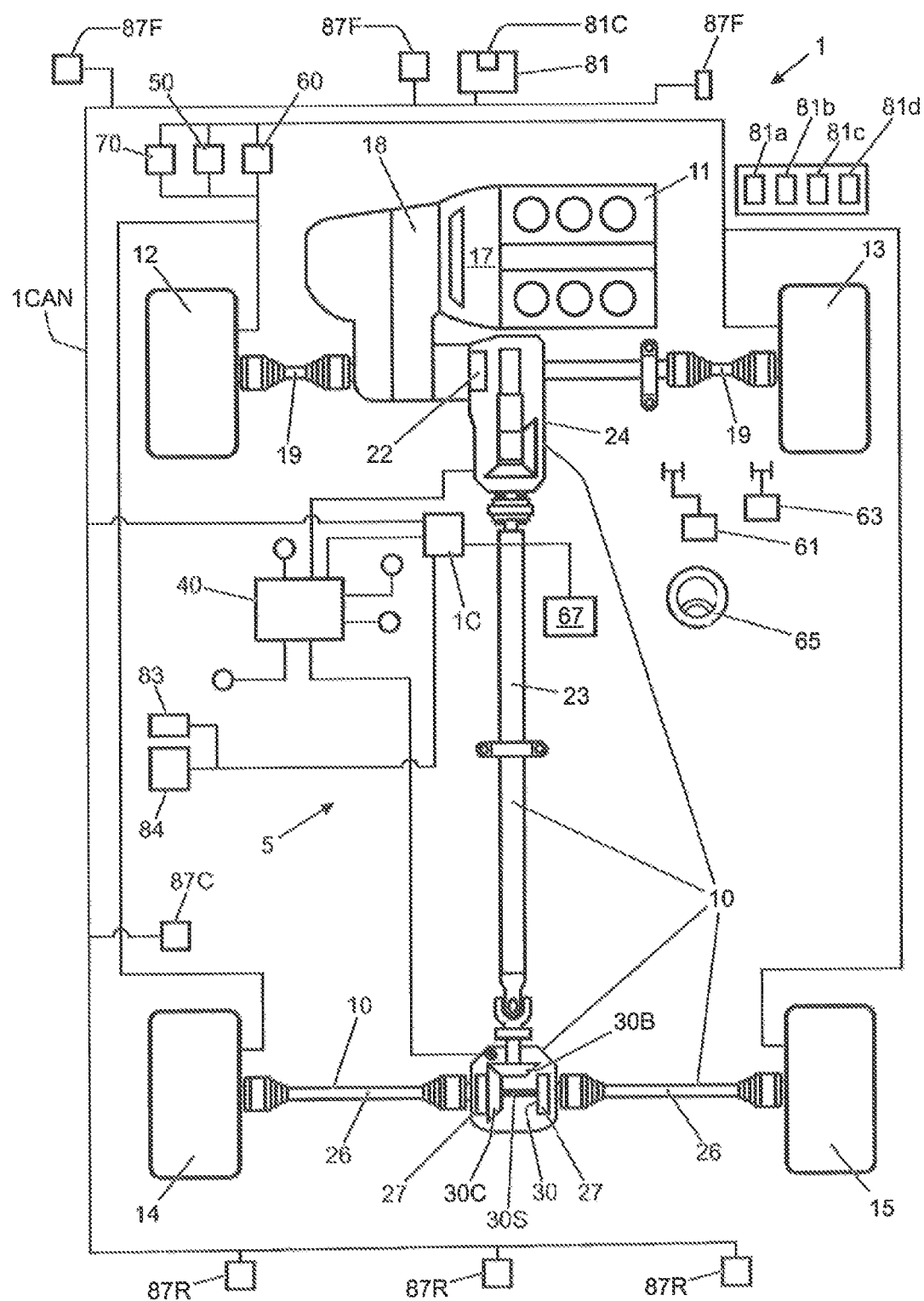
FIG. 1 is a schematic illustration of a vehicle according to an embodiment of the present invention.

A driveline 5 of a motor vehicle 1 according to an embodiment of the present invention is illustrated schematically in FIG. 1. The driveline 5 is connected to a prime mover in the form of an internal combustion engine 11 by means of a gear box 18, and has a pair of front wheels 12, 13, an auxiliary portion 10 and a pair of rear wheels 14, 15.

The driveline 5 is arranged selectively to transmit power supplied to it by the gearbox 18 from the internal combustion engine 11 to the front wheels 12, 13 only (in a two wheel drive mode of operation) or to the front wheels 12, 13 and the rear wheels 14, 15 simultaneously (in a four wheel drive mode of operation).

Power is transmitted from the internal combustion engine 11 to the front wheels 12, 13 by means of a clutch 17, a gearbox 18 and a pair of front drive shafts 19.

Power is transmitted to the rear wheels 14, 15 by means of the auxiliary portion 10 of the driveline 5. The auxiliary portion 10 has a power transfer unit (PTU) 24 having a power transfer clutch (PTC) 22 operable to connect a main drive shaft or prop shaft 23 of the auxiliary portion 10 to the gearbox 18. The prop shaft 23 is coupled in turn to a rear drive unit (RDU) 30 operable to couple the prop shaft 23 to rear drive shafts 26.

The RDU 30 has a pair of clutches 27 having input portions driven by a spool shaft 30S. The spool shaft 30S is driven by a crown gear 30C which is in turn driven by a bevel gear 30B driven by the prop shaft 23. The clutches 27 enable the RDU 30 to connect the prop shaft 23 to the rear drive shafts 26 when the four wheel drive mode of operation is required.

The driveline 5 has a controller 40 arranged to control operation of the PTU 24 and clutches 27. When a four wheel drive mode of operation is required the controller 40 is arranged to close the PTC 22 and to close clutches 27 of the RDU 30. Since the driveline 5 forms part of a powertrain, which includes the engine 11 and gearbox 18, the controller 40 may in some embodiments control the engine 11 and optionally the gearbox 18 in addition to the driveline 5 and be referred to as a powertrain controller. The controller 40 may be arranged to attempt to cause the engine 11 to develop a required amount of torque and/or to rotate at a required speed in some embodiments.

In the embodiment of FIG. 1 the PTC 22 and RDU clutches 27 have respective actuators operable to close the PTC 22 and respective clutches 27 at a selected one of a plurality of different rates. This allows the transition from the two wheel drive mode of operation to the four wheel drive mode of operation to be at one of a corresponding plurality of different rates. It is to be understood that, in the case of a friction clutch, as the clutch is closed, a maximum amount of torque that the clutch is able to transmit from an input to an output thereof increases to a maximum transfer torque value associated with the fully closed condition. In the case of a multi-plate wet clutch the maximum amount of torque the clutch can transmit may be responsive at least in part to an amount of pressure applied to the plates of the clutch.

For the present purposes, a driveline will be considered to be in the four wheel drive mode or configuration if the pressure applied to the plates of one or both of the clutches 27 exceeds a predetermined value. The predetermined value may be determined to be a value that will allow torque of up to a predetermined torque value to be transmitted by a clutch 27.

It is to be understood that the rate at which the respective actuators actuate the respective clutch arrangements may affect a rate of wear of the clutches and potentially one or more other components of the driveline 5. The rate of actuation may also impact the level of NVH (noise, vibration and harshness) experienced by a driver or passenger of a vehicle.

Recognising this, the present inventors have realised that in some circumstances it is desirable to actuate the clutches 27 of the RDU 30 and/or the PTC 22 at a reduced rate in order to reduce a rate at which the rear wheels 14, 15 and/or gearbox are connected to the prop shaft 23. This can reduce a rate of wear of components of the driveline 5 and reduce NVH associated with a transition from the first mode to the second mode.

The controller 40 of the driveline 5 is arranged to control the auxiliary driveline 10 such that slower rates of actuation of the PTC 22 and clutches 27 are employed when a requirement to assume the four wheel drive mode of operation of the driveline 5 is less urgent and higher rates of actuation are employed when the requirement to assume the four wheel drive mode is more urgent.

The vehicle 1 is provided with an antilock braking system (ABS) module 50 arranged to control a brake of one or more wheels of the vehicle to reduce an amount of braking action when required in order to prevent skidding. The vehicle 1 also has a dynamic stability control system (DSC) 60 arranged to control an amount of torque delivered to one or more wheels of the vehicle to prevent wheel slip.

Furthermore, the vehicle 1 has a traction control system (TCS) 70 arranged to monitor wheels of the vehicle 1 and to apply a brake to a wheel in the event that it is determined that the wheel is rotating at a speed that is higher than that required for substantially no wheel slip to occur.

The vehicle has a vehicle control unit (VCU) 10 that is configured to perform a number of vehicle control functions. The VCU 1C receives input signals from a number of vehicle sensor. The sensors (not shown) include sensors which provide continuous sensor outputs to the VCU 1C, including wheel speed sensors, an ambient temperature sensor, an atmospheric pressure sensor, tire pressure sensors, yaw sensors to detect yaw, roll and pitch of the vehicle, a vehicle speed sensor, a longitudinal acceleration sensor, an engine torque sensor (or engine torque estimator), a steering angle sensor, a steering wheel speed sensor, a gradient sensor (or gradient estimator), a lateral acceleration sensor (part of a stability control system (SCS)), a brake pedal position sensor, an acceleration pedal position sensor and longitudinal, lateral, vertical motion sensors.

In some other embodiments, only a selection of the aforementioned sensors may be used.

The vehicle 1 is also provided with a plurality of sensors which provide discrete sensor outputs to the VCU 1C, including a transfer box or PTU status signal (indicating whether a gear ratio of the PTU 24 is set to a HI range or a LO range), a TCS signal and a DSC signal. It is to be understood that the TCS and DSC signals each provide an indication as to whether the TCS or DSC systems 70, 60 are currently intervening to control application of brake torque and/or powertrain torque to one or more wheels, as appropriate, to improve vehicle stability.

The vehicle 1 has a camera module 81 having a forward facing video camera 81C that is configured to provide a live video feed to the VCU 1C. One or more rear facing cameras may be provided in some embodiments. The vehicle 1 also has three forward radar transmit/receive modules 87F and three rear radar transmit/receive modules 87R. The forward and rear modules 87F, 87R are configured to transmit radar waves and to detect transmitted waves that are reflected by objects ahead of and behind the vehicle 1, respectively. Signals generated by the modules 87F, 87R are fed to a radar control module 87C via vehicle controller area network (CAN) bus 1CAN. The radar control module 87C is configured to process the signals received and provide an output to the VCU 1C indicative of the distance of detected objects from the vehicle and their relative direction from the vehicle 1C. It is to be understood that other numbers of forward and/or rear facing radar modules 87F, 87R may be employed in some embodiments. In some embodiments only one or more front facing modules 87F may be provided, or one or more rear facing modules 87R.

The vehicle 1 also has a radio module 83 configured to receive a live traffic data signal from a traffic data service, and a live weather data signal from a weather data service. The module 83 processes the data and outputs the data to the VCU 1C. A location determining system in the form of a global positioning system (GPS) module 84 is also provided that is configured to determine the geographical location of the vehicle 1 by reference to GPS satellite signals. In some embodiments an alternative system for determining vehicle location may be employed such as a general packet radio service (GPRS) module. The VCU 1C is provided with navigation aid functionality. The VCU 1C is configured to allow a user to input an intended destination of the vehicle 1, in response to which the VCU 1C is configured to calculate an optimum route of travel to the intended destination and to provide navigation instructions to the user to enable the user to follow the optimum route.

The vehicle 1 has five subsystems that may be caused by the VCU 1C to operate in one of a plurality of different subsystem configuration modes in order to provide different vehicle performance characteristics such that the vehicle may be operated in a predetermined one of a plurality of different driving modes. Thus, the VCU 1C causes each of the plurality of vehicle subsystems 81a-d, 60 to operate in the subsystem configuration mode appropriate to the selected driving mode. In the present embodiment the subsystems 81a-d, 60 are an engine management system 81a, a transmission control system 81b, an electronic power assisted steering unit 81c (ePAS unit), ABS module 50 and a suspension control system 81d.

In the present embodiment, the VCU 1C is configured to operate the subsystems according to the driving mode that has been selected either manually by a user by means of a selector dial provided in a switchpack 67 accessible to the driver whilst driving, or automatically by the VCU 1C in response at least in part to signals received from various sensors on the vehicle. In the automatic mode of driving mode selection, the VCU 1C selects the driving mode according to the type of terrain in which the vehicle 1 is operating as determined by reference at least in part to the signals received from the sensors, as described in UK patent GB2492655 referred to above.

The driving modes include a grass/gravel/snow driving mode (GGS mode) that is suitable for when the vehicle is travelling in grass, gravel or snow terrain, a mud/ruts driving mode (MR mode) which is suitable for when the vehicle is travelling in mud and ruts terrain, a rock crawl/boulder mode (RB mode) which is suitable for when the vehicle is travelling in rock or boulder terrain, a sand mode which is suitable for when the vehicle is travelling in sand terrain (or deep soft snow) and a special programs OFF mode (SP OFF mode) which is a suitable compromise mode, or general mode, for all terrain conditions and especially vehicle travel on motorways and regular roadways. The SP OFF mode may also be referred to as an 'on-road' or 'on-highway' driving mode. Many other driving modes are also envisaged.

The different terrain types are grouped according to the friction of the terrain and the roughness of the terrain. For example, it is appropriate to group grass, gravel and snow together as terrains that provide a low friction, smooth surface and it is appropriate to group rock and boulder terrains together as high friction, very high roughness terrains.

The manner in which the VCU 1C is configured to cause the subsystems 81a-d, 60 to operate in different respective driving modes is described in more detail UK patent GB2492655 referred to above.

Although five subsystems 81a-d, 60 are illustrated as being under the control of the VCU 1C, in practice a greater number of vehicle subsystems 81a-d, 60 may be included on the vehicle 1 and may be under the control of the VCU 1C. The VCU 1C includes a subsystem control module which provides control signals to each of the vehicle subsystems 81a-d, 60 to cause each subsystem 81a-d, 60 to operate in the subsystem configuration mode corresponding to the selected driving mode. Thus, each subsystem 81a-d, 60 may be caused to operate in a manner appropriate to the driving condition, such as the terrain or driving surface, in which the vehicle 1 is travelling (referred to as the terrain condition). The subsystems 81a-d, 60 also communicate with the subsystems control module of the VCU 1C to feed back information on subsystem status.

It is to be understood that in the present embodiment the controller 40 is operable to control the driveline 5 to assume the four wheel drive mode in dependence on the driving mode in which the VCU 1C is causing the vehicle 1 to operate. In the present embodiment, the controller 40 causes the driveline 5 to operate in the four wheel drive mode when the VCU 1C is operating in a driving mode other than the on-highway driving mode. When the VCU 1C is operating in the on-highway driving mode the VCU 1C causes the controller 40 to cause the driveline to operate in the two wheel drive or four wheel drive mode according to an active driveline control strategy.

B-824

In the present embodiment, when operating in the on-highway driving mode the controller 40 is arranged to cause the driveline 5 to operate in the two wheel drive mode at speeds above a predetermined upper threshold speed for four wheel drive operation, v_U4WD. In the case that the driveline 5 is in the four wheel drive mode and the speed exceeds v_U4WD, the controller 40 causes the driveline 5 to assume the two wheel drive mode. This feature has the advantage that the vehicle 1 will typically consume less fuel, and may also emit a lower amount of unwanted combustion products compared with continued operation in the four wheel drive mode above v_U4WD. In the present embodiment the value of v_U4wd is set to a value of 35 kph although other values may be useful in some embodiments such as 30 kph, 40 kph or any other suitable value.

If the driveline 5 is in the two wheel drive mode and the vehicle speed falls below a predetermined lower threshold speed for four wheel drive operation, v_L4WD, the controller 40 causes the driveline 5 to switch from the two wheel drive mode to the four wheel drive mode. In the present embodiment, v_L4WD is set to a value of 12 kph although other values may be useful in some embodiments such as 10 kph, 15 kph, 20 kph, 25 kph or any other suitable value. It is to be understood that, since v_L4WD<v_U4WD, hysteresis is present in respect of the speeds at which transitions between the two and four wheel drive modes occur. This feature has the advantage that it reduces the risk of mode chattering which might otherwise occur if v_L4WD were substantially equal to v_U4WD and the vehicle speed was to oscillate between speeds above and below v_L4WD in relatively rapid succession.

When the driveline 5 is operating in the four wheel drive mode at speeds below v_U4WD, the VCU 1C is configured to repeatedly determine whether a predetermined first set of conditions are met. If the conditions are met, the VCU 1C determines that the driveline 5 may be operated in the two wheel drive mode instead of the four wheel drive mode when the driveline is operating in the four wheel drive mode below v_U4WD.

In the present embodiment the first set of conditions are as follows:
 (a) the vehicle 1 is travelling in heavy traffic;
 (b) the vehicle 1 is not approaching a junction at which traffic may merge;
 (c) the prevailing environmental conditions indicate a relatively low likelihood that the coefficient of friction between driving wheels and the driving surface, surface mu, is reduced significantly below unity.

The manner in which the VCU 1C determines whether conditions (a) to (c) are met will now be described with reference to the schematic function diagram of FIG. 2 which illustrates function blocks associated with operation of the VCU 1C.

Reference herein to a block such as a function block is to be understood to include reference to software code for performing the function or action specified in which an output is provided responsive to one or more inputs. The code may be in the form of a software routine or function called by a main computer program, or be code forming part of a flow of code not being a separate routine or function. Reference to function block is made for ease of explanation of the manner of operation of the VCU 1C of the present embodiment. It is to be understood that in some alternative embodiments a different arrangement of software code may be employed, such as an alternative arrangement of function blocks.

GPS function block F101 of the VCU 1C is configured to receive a signal from GPS module 84 in respect of vehicle location. The GPS function block F101 outputs the location of the vehicle 1 as a geographical coordinate to a road merge detection function block F105. A satellite navigation (sat nav) road mapping function block F103 supplies the road merge detection function block F105 with data in respect of road layout on receipt of a request by the road merge detection function block F105 based on location information provided by the GPS function block F101. It is to be understood that the road merge detection function block F105 may request road layout data from the road mapping function block F103 according to the location information provided by the GPS function block F101. The road merge detection function block F105 is configured to detect junctions ahead of a vehicle 1 and to alert the comparison function block F131 to the presence of a junction when a junction is detected that is within a predetermined distance of the vehicle 1. In some embodiments, in addition or instead the road merge detection function block F105 may be configured to alert the comparison function block F131 to the presence of a junction when a junction is detected that is predicted to be reached within a predetermined time period of the vehicle's current location.

The VCU 1C also has a traffic jam detection function block F117 that receives data from a vehicle sensing function block F111, vehicle speed function block F113 and a traffic reports function block F115.

In the present embodiment the sensing function block F111 receives the following data:
 (a) video data captured by the camera module 81C;
 (b) data in respect of lateral and longitudinal acceleration generated by the ABS module 50; and
 (c) data in respect of the presence of objects ahead of and behind the vehicle, generated by the radar control module 87C.

The sensing function block F111 is configured to process the video data from the camera module 81C in order to detect the presence of traffic ahead of the vehicle 1 using known image analysis techniques. In particular, the sensing function block F111 monitors the intensity of light ahead of the vehicle and attempts to determine when a vehicle ahead of the vehicle 1 has its brake lights illuminated. It is to be understood that in some embodiments image recognition techniques may be employed to enable identification of brake lights in an image captured by the camera module 81C. The sensing function block F11 attempts to determine when the brake lights are illuminated, indicating the vehicle ahead is braking, and provides a corresponding output to the traffic jam detection function block F117.

The function block F111 also attempts to detect the presence of traffic control signals ahead of the vehicle, also using known image analysis techniques. In the present embodiment the function block F111 is configured to detect the presence of traffic control lights ahead of the vehicle. The function block F111 attempts to do this by detecting traffic signal colours as well as transitions between the colour of light emitted by the traffic control lights. If traffic is detected ahead of the vehicle or control signals are detected, the function block F111 provides a corresponding signal to the traffic jam detection function block F117.

The sensing function block F111 also provides a signal to the traffic jam detection function block F117 indicating whether the radar control module 87C has detected the presence of traffic ahead of and/or behind the vehicle 1. The sensing function block F111 is configured to provide a signal to the traffic jam detection function block F117 indicating the value of the distance between the vehicle 1 and the vehicle ahead.

In response to receipt of signals indicative of lateral and longitudinal acceleration of the vehicle 1, the sensing function block F111 also provides a signal indicative that the vehicle is operating in heavy traffic to the traffic jam function block F117. In the present embodiment, the signal is provided if the function block F111 determines that the vehicle has undertaken more than a predetermined number of acceleration/deceleration manoeuvres in a predetermined amount of time or over a predetermined distance. In some embodiments, an acceleration/deceleration manoeuvre is defined as a manoeuvre in which the vehicle 1 is accelerated such that an increase in speed by more than a predetermined amount takes place before the vehicle 1 is subsequently decelerated to reduce speed by more than a predetermined amount, the manoeuvre taking place within a predetermined amount of time or over a predetermined distance. In the present embodiment, an acceleration/deceleration manoeuvre is defined as a manoeuvre in which the vehicle 1 is accelerated so as to increase speed by more than 10 kph before being subsequently decelerated to reduce speed by more than 10 kph, the manoeuvre taking place within a period of 2 minutes or over a distance of less than 500 m. Other arrangements may be useful. Other definitions of an acceleration/deceleration may be useful in some embodiments, such as different values of speed increase and/or decrease. In the present embodiment the function block provides the signal indicative of heavy traffic to the traffic jam function block F117 if the vehicle 1 undertakes three or more acceleration/deceleration manoeuvres within a period of 5 minutes. Other arrangements may be useful in some embodiments.

Vehicle speed function block F113 is configured to receive a signal corresponding to vehicle speed from the ABS module 50. The speed signal may be referred to as a reference speed signal v_ref. The function block F113 outputs the reference speed signal v_ref to the traffic jam detection function block F117.

Traffic reports function block F115 is in communication with radio module 83 which is configured to receive a live traffic data signal from a traffic data service as noted above. The traffic reports function block F115 provides a signal to the traffic jam detection function block F117 when the function block F115 determines, based on the traffic data signal, that the vehicle is likely operating in heavy traffic. It is to be understood that any suitable means for obtaining traffic data service information may be employed, such as a wireless data infrastructure such as a municipal wireless network, a mobile telephone data network such as 2G, 3G, 4G, 5G or any other suitable network. The radio module 83 may be configured to receive the traffic data signal via an interface to another mobile device such as a mobile telecommunications device, for example a smart phone via a short range wireless connection such as a Bluetooth (®) connection, wired connection or any other suitable connection. In some embodiments the information may be received via a connected interface, such as via a mobile smart phone that is in communication with a data source external to the vehicle such as a cloud based source via a communications link installed in the vehicle.

The traffic jam detection function block F117 is configured to determine, based on the data received from function blocks F111, F113 and F115, whether the vehicle is operating in heavy traffic conditions which justify operation of the driveline 5 in the two wheel drive mode. A signal indicative of the result of this determination is output by the traffic jam detection function block F117 to the comparison function block F131.

It is to be understood that in some embodiments the traffic jam detection function block F117 may be configured to output a signal indicative that the vehicle is operating in heavy traffic conditions which justify operation of the driveline 5 in the two wheel drive mode if the signals received from the sensing function block F111 indicate that a vehicle is located ahead of the vehicle 1 within a predetermined distance, in the present embodiment a distance of 2 m, and/or the function block F117 determines, based on one or more signals received from the sensing function block F111, that the brake lights of the vehicle ahead have been illuminated for longer than a predetermined period of time. The predetermined period may be any suitable period such as a period of 10 s, 20 s, 30 s, 60 s or any other suitable period.

The VCU 1C also implements an environmental conditions function block F127. The environmental conditions function block F127 receives data signals from a weather reports function block F121, a rain sensor function block F123 and a temperature sensor function block F125.

The weather reports function block F121 processes the live weather data received by the VCU 1C from the radio module 83. The function block F121 determines based on the data the likelihood that a surface coefficient of friction between the road wheels and driving surface, surface mu, may have been compromised by precipitation, resulting for example in the presence of water, snow, ice or the like on the driving surface. The function block F121 then provides an output to the environmental conditions function block F127 indicative of whether surface mu is likely to have been compromised.

The rain sensor function block F123 receives a signal from a rain sensor module indicative of whether precipitation has been detected. A signal is then output by the rain sensor function block F123 to the environmental conditions function block F127 indicative of whether or not precipitation has been detected by the rain sensor module. In some embodiments the rain sensor function block F123 may only output the signal indicative that precipitation has been detected if the rain sensor function block F123 provides a signal indicative of the detection of precipitation for more than a predetermined period of time, such as 20 s, 30 s or 60 s, or any other suitable time period. This is in order to reduce the risk of a false determination that precipitation is occurring, for example as a result of the presence of cleaning fluid on the rain sensor as a result of washing of a windshield of the vehicle 10 whilst driving.

The temperature sensor function block F125 is configured to receive a signal from an ambient temperature sensor indicative of an outside air temperature (OAT). The temperature sensor function block F125 outputs a signal to the environmental conditions function block F127 indicative of the OAT. In some embodiments the temperature sensor function block F125 outputs a signal to the environmental conditions function block F127 only if OAT is detected to be less than a critical temperature, such as 5C. Other values of critical temperature may be useful in some embodiments.

In response to receipt of signals from function blocks F121, F123 and F125, the environmental conditions function block F127 determines whether the prevailing weather conditions justify operation of the driveline 5 in the two wheel drive mode.

In the present embodiment the environmental conditions function block F127 is configured to determine that the conditions justify operation of the driveline 5 in the two wheel drive mode when any one of the following conditions are met:
(a) ambient temperature is above a pre-determined threshold value, which in the present embodiment is a temperature of 3C;
(b) rain sensors indicate that no rain has been detected within a predetermined period of time. The predetermined period of time may be dependent on temperature. For example, the predetermined period may be higher for higher temperatures since the time taken for a driving surface to become dry following rain fall is typically expected to decrease with increasing temperature. Other factors may be taken into account in addition or instead in some embodiments such as wind speed.

In some embodiments, the VCU 1C may be configured to increase the likelihood that the driveline 5 operates in the two wheel drive mode, or trigger operation of the driveline 5 in the two wheel drive mode, if certain predetermined conditions are met such as conditions (a) or (b) above.

In some embodiments, the VCU 1C may be configured to increase the likelihood that the driveline 5 operates in the four wheel drive mode, or trigger operation of the driveline 5 in the four wheel drive mode, if certain predetermined conditions are met. For example in some embodiments the VCU 1C may be configured to cause operation of the driveline 5 in the four wheel drive mode if the following conditions are met:
(a) ambient temperature is below a pre-determined threshold value, for example a temperature of 3C;
(b) an intensity of detected rainfall is greater than a predetermined amount; or
(c) weather reports indicate that either precipitation may be present, for example that it may be raining or snowing, or that ice or snow may be present on a driving surface.

The comparison function block F131 compares the signals received from the road merge detection function block F105, traffic jam detection function block F117 and environmental conditions function block F127 and generates a signal indicating whether operation in the four wheel drive mode should be assumed based on the comparison.

The comparison function block F131 is configured to determine that operation in the two wheel drive mode should be assumed if each of the following conditions are met:
(a) the road merge detection function block F105 indicates that a junction is not present within a predetermined distance of the vehicle 1
(b) the traffic jam detection function block F117 indicates the vehicle 1 is operating in heavy traffic conditions which justify operation of the driveline 5 in the two wheel drive mode; and
(c) the environmental conditions function block F127 indicates that the prevailing environmental conditions justify operation of the driveline 5 in the two wheel drive mode.

The comparison function block F131 then outputs a signal to a control function block F133 indicating whether the driveline 5 should be operated in the two wheel drive mode.

The control function block F133 receives the signal output by the comparison function block F131 and in addition a signal received from an override function block F141. In response to these signals, the control function block F133 determines whether the driveline should be operated in the two wheel drive or four wheel drive mode. The control function block F133 then issues a corresponding signal to the driveline controller 40 requesting operation of the driveline in the two wheel drive mode or four wheel drive mode.

The signal received by the control function block F133 from the override function block F141 is indicative of whether the function block F141 has determined that an override condition exists. By override condition is meant a condition which, if met, is sufficient to justify operation of the driveline 5 in the four wheel drive mode even if the comparison function block F131 has determined that operation in the two wheel drive mode may be justified in view of the signals input to the comparison function block F131.

In the present embodiment, the override function block F141 is configured to determine that an override condition is met if any one of the following conditions are met:
(a) the vehicle is approaching a body of water, as determined by reference to analysis of video data provided by the camera module 81C and geographical location data provided by the GPS module 84;
(b) the vehicle is approaching a gradient that is substantially equal to or greater than a predetermined gradient value, as determined by reference to the GPS module 84; and
(c) the vehicle is approaching a gradient that is substantially equal to or greater than a predetermined towing gradient value as determined by reference to the GPS module 84, and the system determines that the vehicle is towing.

It is to be understood that, in respect of condition (a) the function block F141 may analyse video data provided by the camera module 81C and attempt to identify the existence of a body of water such as a body of standing water in a path of the vehicle 1. The manner in which such a determination may be made will not be discussed herein, however known techniques for recognising objects and terrain such as bodies of water based on video data are known. A path of the vehicle 1 may be predicted by reference to road route data stored by the GPS module 84.

In some embodiments, in addition to or instead, condition (a) above may include the condition that the vehicle is approaching a driving surface in which the presence of mud and/or ice is present. Detection of an area of mud and/or ice may be made by reference to video data captured by the camera module 81 or any other suitable means.

In some embodiments, the override function block F141 may be configured to determine whether the vehicle 1 will be able to make adequate progress over terrain in the event that the two wheel drive mode is assumed. For example, in some embodiments such as some embodiments not having an environmental conditions function block F127, the override function block may be configured to determine whether the prevailing or predicted value of surface coefficient of friction between one or more predetermined wheels such as one or more driving wheels is less than a predetermined value. The override function block F141 may be configured to determine that an override condition exists in the event that this condition is met, optionally in addition to one or more further conditions. It is to be understood that the override function block F141 may refer to a value of surface mu employed by the VCU 1C as a reference value of surface mu. The value of surface mu is determined in the present embodiment by the ABS module 50. In the present embodiment the ABS module 50 is configured to estimate the prevailing value of surface mu in dependence on the detection of slip between one or more wheels and the driving surface.

In some embodiments, if the vehicle is approaching a surface having a surface coefficient of friction at or below a predetermined value, as determined by reference to analysis of video data provided by the camera module 81C, the override function block F141 may be configured to determine that an override condition exists in the event that this condition is met, optionally in addition to one or more further conditions.

In some embodiments the vehicle may be provide with a control input permitting a user manually to override the override function block F141 such that the override function block F141 is unable to override the decision otherwise made by the comparison function block F131 as to whether the driveline should be operated in the two wheel drive mode or four wheel drive mode. The control input may provided by switchpack 67, which may include a touch screen display or the like.

The driveline controller 40 is configured to take into account the signal received from control function block F133 in determining the mode in which the driveline 5 is to be operated at a given moment in time. The driveline controller 40 takes into account a number of parameters when determining the mode in which the driveline 5 is to be operated. In the present embodiment these are: (a) vehicle speed as described above with reference to v_U4WD and v_L4WD, and (b) whether the TCS 70 or SCS 60 is currently intervening to cause a change in the amount of powertrain torque or brake torque applied to one or more wheels. If the TCS 70 or SCS 60 are intervening, the driveline controller 40 determines that the driveline should be operated in the four wheel drive mode.

It is to be understood that in some embodiments the controller 40 may be arranged to cause the driveline 5 to assume the four wheel drive mode from the two wheel drive mode in dependence on one or more of steering wheel angle, rate of change of steering wheel angle and vehicle speed. For example, in some embodiments the controller 40 may be configured to cause the driveline 5 to assume the four wheel drive mode when each of the following conditions (a) to (c) are met:
  (a) an instant angle of a steering wheel 65 of the vehicle 1 with respect to a straight-ahead position exceeds a prescribed threshold value;
  (b) at substantially the same time, a rate of change of steering wheel angle exceeds a prescribed rate; and
  (c) the vehicle 1 is travelling at a speed that is above a predetermined threshold speed.

In some embodiments the predetermined threshold speed is 20 kph although other values may be useful in some embodiments. The threshold values of steering wheel angle and rate of change of steering wheel angle may each be a function of vehicle speed in some embodiments.

In some embodiments, in addition or instead the controller 40 may be arranged to cause the driveline 5 to assume the four wheel drive mode from the two wheel drive mode when a value of lateral acceleration of the vehicle 1 exceeds a prescribed threshold value. In some embodiments the prescribed threshold value may be around 2 ms-2. Other values may be useful in some embodiments.

In some embodiments, the controller 40 may be configured not to permit the driveline to transition from the four wheel drive mode to the two wheel drive mode within a predetermined time period of causing a transition to the four wheel drive mode from the two wheel drive mode. This period may be referred to as a disconnect delay period. Any suitable disconnect delay period may be employed such as 5 s, 10 s or any other suitable period.

In some embodiments the controller 40 may be operable in a 'torque on demand' mode in which the controller 40 controls the clutches 27 of the RDU 30 so as to vary the amount of available torque coupling between input and output portions of the clutches 27 from substantially no torque coupling to substantially maximum available torque coupling such that the clutches 27 may be operated in a state in which the amount of torque coupling available has a value intermediate the minimum and maximum values. For example, the controller 40 may cause the driveline 5 to operate in the four wheel drive mode with a predetermined torque split between front and rear axles. The amount of torque split may be determined according to one or more vehicle parameters such as vehicle speed, rate of longitudinal and/or lateral acceleration, and/or throttle pedal position. The amount of torque split may be varied according to any required ratio. For example, the controller 40 may be configured under certain conditions to deliver 60% of the available driveline torque to the front wheels 12, 13 and 40% of the available driveline torque to the rear wheels 14, 15, and in other circumstances to deliver 50% of the available driveline torque to the front wheels 12, 13 and 50% of the available driveline torque to the rear wheels 14, 15.

It is to be understood that torque coupling may be available between input and output portions of the clutches 27 in the sense that the driveline 5 is in a configuration such that when torque is applied to the input portion of the clutch 27 torque is transmitted to the output portion, regardless of whether torque is actually applied to the input portion. It is to be understood that residual torque coupling may be provided between the input and output portions when the clutches are fully open due for example to the presence of hydraulic fluid in the RDU 30 causing a relatively small amount of fluid coupling between the input and output portions in the case of hydraulically actuated clutch devices. Such coupling is ignored for the present purposes.

In the present embodiment, employing hydraulically actuated clutches, variation in the amount of torque coupling is achieved by varying the amount of hydraulic fluid pressure urging clutch plates of the clutches 27 together. It is to be understood that, whilst the amount of torque coupling may be varied by varying the fluid pressure, the driveline 5 may be considered to be in the four wheel drive configuration provided torque applied to an input of at least one clutch 27 results in torque transfer to the output of the clutch 27 due to hydraulic fluid pressure being at or above a predetermined value. Accordingly, whilst residual torque coupling may exist when the hydraulic fluid pressure is below the predetermined value due to (say) the presence of hydraulic fluid between plates of the clutches 27, the driveline 5 may still be considered to be in the two wheel drive mode because the fluid pressure is below the predetermined value.

In some embodiments employing one or more electrical actuators, the determination whether the driveline 5 is in the two wheel drive mode or four wheel drive mode may be made by reference to a determination whether the amount of current consumed by an electrical actuator urging the clutch plates together exceeds a predetermined value. Other arrangements may be useful in some embodiments. In some embodiments one or more sensors such as position sensors and/or pressure sensors may be provided for measuring the amount of pressure applied by an actuator and/or the position of the actuator, in order to determine whether the driveline 5 is in the two wheel or four wheel drive mode.

It is to be understood that other configurations of driveline 5 may be useful instead of a driveline employing an RDU with twin clutch arrangement and no differential gear arrangement. For example in some embodiments a differential gear arrangement may be provided in which one or more clutches are provided to permit switching between the two wheel drive and four wheel drive modes of operation. For example in some embodiments the one or more clutches may permit disconnection of the differential from the prop shaft such that the differential comes to rest when the driveline 5 is in the two wheel drive configuration. In some embodiments one or more clutches may permit disconnection of the prop shaft from the differential gear arrangement such that the prop shaft may come to rest when the driveline 5 is operated in the two wheel drive configuration but at least part of the differential gear arrangement continues to turn whilst the vehicle is moving.

It is to be understood that, in some embodiments, when the VCU 1C is operating in the on-highway driving mode the controller 40 may be configured to cause the driveline 5 to assume the four wheel drive mode if the ambient temperature falls below a prescribed value. In the present embodiment the prescribed temperature is −10 Celsius although other values are also useful.

Furthermore, in some embodiments, when the VCU 1C is operating in the on-highway driving mode and the vehicle 1 is started from a key-off condition in which the engine 11 is switched off, the controller 40 is configured to cause the driveline 5 to remain in the four wheel drive mode until the vehicle 1 has traveled a predetermined distance such as a distance of 2 km or any other suitable value. If the speed of the vehicle 1 exceeds a predetermined speed value such as a speed of 50 kph or any other suitable value at any point within the predetermined distance, the controller 40 may consider that the predetermined distance has been traveled and resume normal operation.

Some embodiments of the present invention have the advantage that a driveline 5 may be operated in a predetermined configuration such as a two wheel drive mode as opposed to a four wheel drive mode under circumstances in which operation in that configuration would not otherwise occur. This feature may enable operation of a vehicle in a more fuel efficient manner and/or with lower emissions. In some embodiments, reduced component wear may be enjoyed when the driveline is operated in one configuration such as a two wheel drive mode compared with another configuration such as a four wheel drive mode. In some embodiments, operation in the two wheel drive mode may take place in circumstances in which operation in the four wheel drive mode might otherwise take place if it is determined that enhanced traction offered by the four wheel drive mode is less important for vehicle operations than the benefits of reduced fuel consumption, emissions and/or driveline wear that may be associated with operation in the two wheel drive mode.

As noted above, the VCU 1C is configured to monitor the location of the vehicle 1 by reference to an output of a GPS monitor function block F101. When it is determined that the vehicle 1 is operating on-road, the VCU 1C is configured to monitor the path of travel of the vehicle 1 and to predict the path of travel. If a user has input an intended destination to the VCU 1C the present embodiment the path of travel is predicted based on the route calculated by the VCU 1C. In the absence of intended route information the VCU 1C is configured to assume that the vehicle 1 will continue along the road it is currently driving along. The VCU 1C is configured to predict the magnitude of lateral acceleration to which the vehicle 1 may be subject as it continues along its current path of travel. The magnitude of lateral acceleration may be predicted in dependence at least in part on vehicle speed.

The VCU 1C also calculates a maximum acceptable value of lateral acceleration for travel in the two wheel drive driveline configuration, Lat_acc_max. In determining the value of Lat_acc_max the VCU 1C takes into account a number of factors. As shown in FIG. 3, the VCU 1C has a tire characteristic function block F215 that is configured to output to a lateral acceleration limits function block F217 a value of a parameter that is set in dependence on the grip characteristics of road tires fitted to wheels of the vehicle 1. The lateral acceleration limits function block F217 also receives an input from the environmental conditions function block F127 described above with respect to FIG. 2. The lateral acceleration limits function block calculates, and outputs to a comparison function block F231, the value of Lat_acc_max.

The VCU 1C also implements a bend radius calculator function block F205 that calculates a radius of curvature of the predicted route of travel of the vehicle 1 ahead of the vehicle 1. The bend radius calculator function block F205 receives an input from the GPS monitor function block F101 indicative of vehicle location and requests road layout data from the road mapping function block F103. The bend radius calculator function block F205 then calculates a radius of curvature of a predicted route of the vehicle 1 over a predetermined distance ahead of the vehicle 1. In the present embodiment the function block F205 identifies the smallest value of radius of curvature of the route of travel over the predetermined distance ahead of the vehicle 1. In the present embodiment the predetermined distance is a distance of 0.5 km although other distances may be useful such as 1 km, 1.5 km, 2 km or any other suitable distance.

In some embodiments the bend radius calculator function block F205 calculates a radius of curvature of a predicted route of the vehicle 1 that will be negotiated within a predetermined time period, based on a speed of the vehicle 1. In some embodiments the predetermined time period may be a period in the range of from around 60 s to around 300 s although other values may be useful.

The bend radius calculator function block F205 outputs the smallest value of radius of curvature over the route ahead of the vehicle 1 as described above to a lateral acceleration function block F207. Function block F207 is also configured to receive a value of instantaneous vehicle speed from the vehicle speed function block F113. Function block F207 calculates the expected or predicted maximum value of lateral acceleration of the vehicle 1 over the predetermined distance ahead, Lat_acc_pred, on the basis that the maximum lateral acceleration will be experienced when the vehicle 1 negotiates a bend having a value of radius of curvature substantially equal to that of the smallest value of radius of curvature of the route ahead. The value of Lat_acc_pred is output to comparison function block F231. In the present embodiment the function block F207 continually calculates the expected or predicted maximum value of lateral acceleration of the vehicle 1 over the predetermined distance ahead, which as noted above is set to 0.5 km in the present embodiment.

As noted above, comparison function block F231 also receives an input of the value of Lat_acc_max from function block F217. Function block F231 compares the value of Lat_acc_pred and Lat_acc_max and, if the value of Lat_acc_pred is greater than or equal to Lat_acc_max, outputs a signal to control function block F133 indicating that the driveline 5 should be operated in the four wheel drive mode in anticipation of the increase in lateral acceleration that may be experienced by the vehicle 1. Thus, the driveline 5 may be placed in a condition ready to negotiate the bend when it is a distance of up to 0.5 km from the bend.

Figure 2:
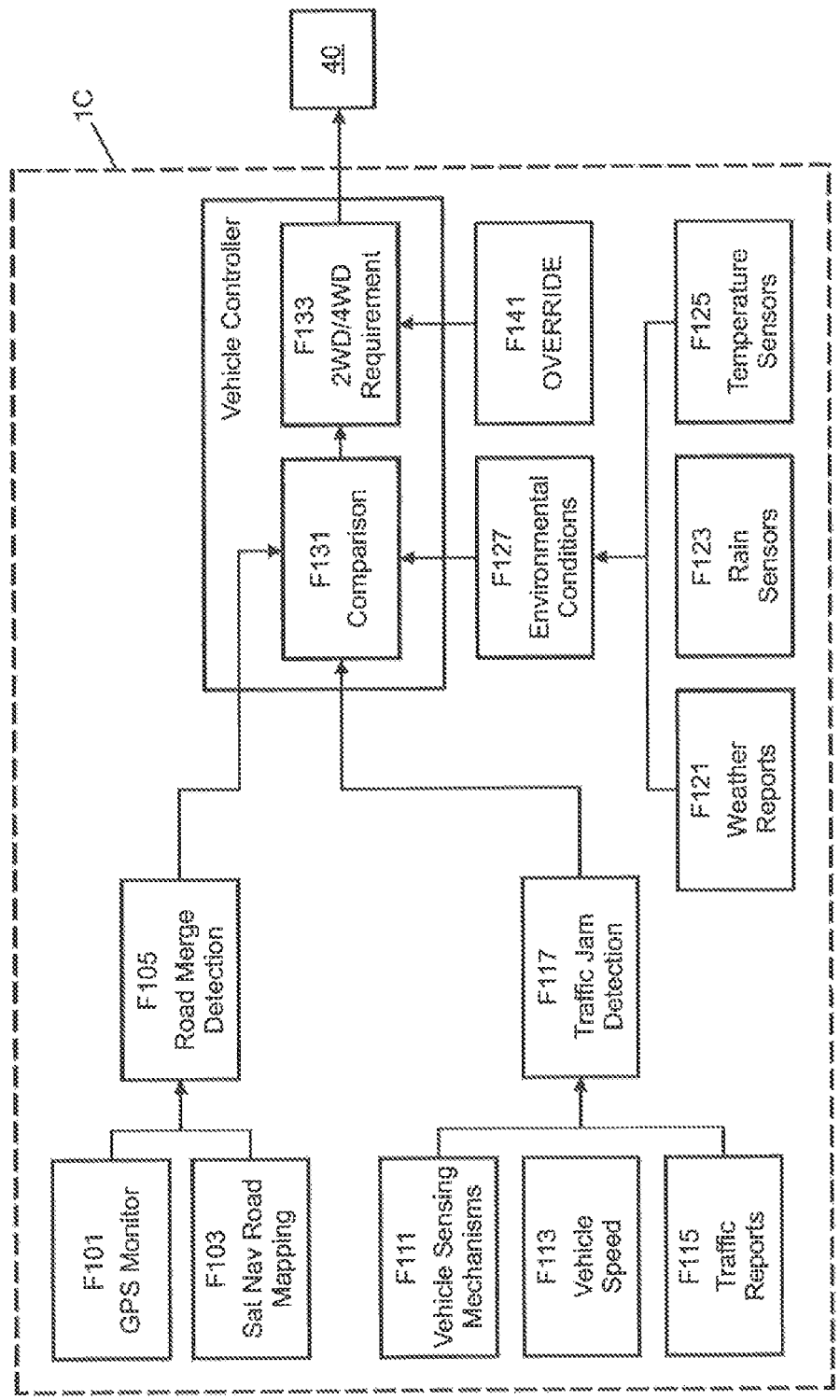
FIG. 2 is a flow diagram illustrating operation of a portion of a vehicle control system of the vehicle of FIG. 1.
Figure 3:
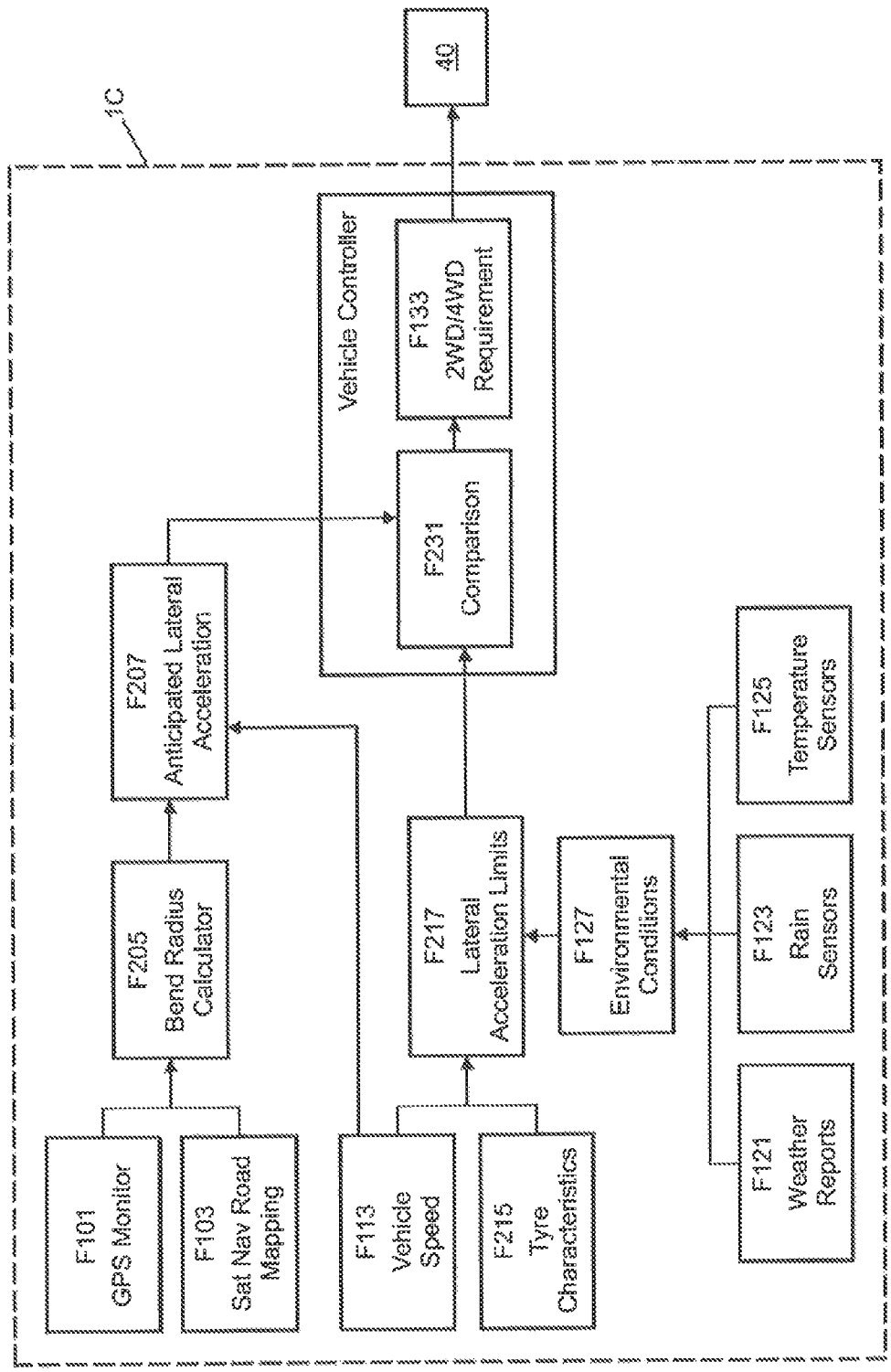
FIG. 3 is a flow diagram illustrating operation of a portion of a vehicle control system of the vehicle of FIG. 1.

In the present embodiment the comparison function block F231 is provided in addition to comparison function block F131 illustrated in FIG. 2 and operates substantially independently of comparison function block F131. It is to be understood that, in some alternative embodiments, the functionality of function blocks F131 and F231 may be combined such that function block F131 also takes into account the output of comparison function block F231. In some embodiments, comparison function block F131 illustrated in FIG. 2 may also perform the functionality of function block F231.

As described above with respect to FIG. 2, the driveline controller 40 is configured to take into account the signal received from control function block F133 in determining in which mode the driveline 5 should be operated at a given moment in time.

Figure 4:
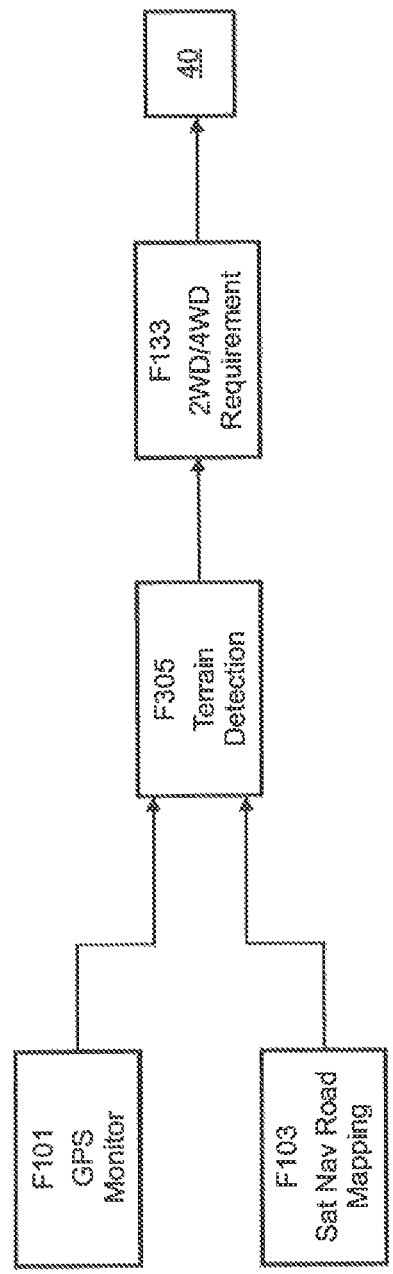
FIG. 4 is a flow diagram illustrating operation of a portion of a vehicle control system of the vehicle of FIG. 1.

In some embodiments, the control function block F133 may be configured to receive a signal indicative of whether the vehicle 1 is operating on-road or off-road. FIG. 4 illustrates the functionality of a portion of a VCU of a vehicle according to an embodiment of the present invention.

The VCU is configured to implement a terrain detection function block F305 that receives a signal indicative of vehicle location from the GPS monitor function block F101. The terrain function block F305 requests road layout data from road mapping function block F103 according to the location information provided by the GPS function block F101. In particular, the terrain function block F305 determines by reference to the road mapping function block F103 whether the current location of the vehicle 1 corresponds to an on-road location or an off-road location. If the current location does not correspond to a road stored by the road mapping function block F103 the terrain detection function block F305 determines that the vehicle 1 is operating off-road. If the terrain detection function block F305 determines that the vehicle 1 is operating off-road the function block F305 issues a signal to the control function block F133 indicating that the vehicle 1 is operating off-road. In response to this signal the control function block F133 is configured to cause the driveline 105 to assume the four wheel drive configuration.

In some embodiments, if the terrain detection function block F305 determines that the vehicle 1 is operating on-road, the function block F305 issues a signal to the control function block F133 indicating that the vehicle 1 is operating on-road. Other arrangements may be useful in some embodiments.

In some embodiments the controller 40 is configured to cause locking torque to be applied between two or more wheels of the driveline 5 in dependence on vehicle location. By locking torque is meant that an amount of relative torque that is required to be applied to two or more wheels in order to cause relative rotation may be adjusted thereby to reduce any relative rotation between the wheels. It is to be understood that locking torque between wheels of a given axle may be useful in preventing spin of one wheel relative to the other due to a difference in surface coefficient of friction between each wheel and the driving surface on which the wheel is resting. Locking torque may be applied between wheels of a given axle, referred to as cross-axle lock, and/or between respective axles, referred to as inter-axle lock.

In the embodiment of FIG. 1, cross-axle locking torque may be applied between the rear wheels 14, 15 of the vehicle by closure of clutches 27 of the RDU 30. The amount of pressure causing closure of the clutches 27 may in some embodiments be increased relative to that required for normal 4WD operation where differences in wheel speed due to cornering are accommodated by slippage of one clutch 27 relative to the other.

It is to be understood that some embodiments of the present invention may be used with a range of different types of driveline.

Figure 5:
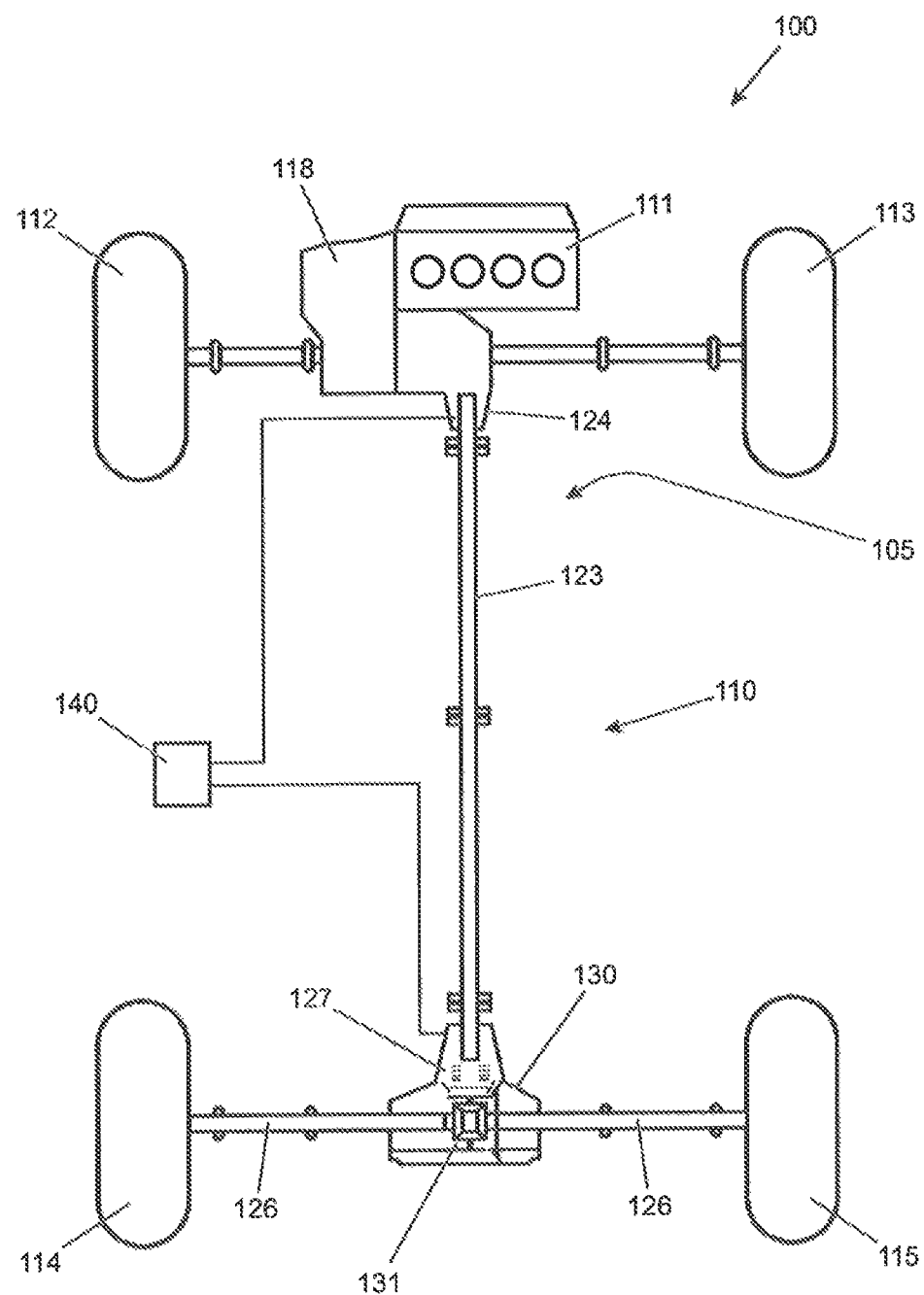
FIG. 5 is a schematic illustration of a vehicle according to a further embodiment of the present invention.

FIG. 5 illustrates a portion of a vehicle 100 according to a further embodiment of the present invention. Like features of the embodiment of FIG. 5 to those of the embodiment of FIG. 1 are shown with like reference signs incremented by 100.

The vehicle 100 has a driveline 105 having a PTU 124 having a PTC (not shown) configured to allow a prop shaft 123 to be connected to a gearbox 118. At an opposite end of the prop shaft 123, a rear drive unit 130 is provided having a clutch 127 in the form of a multi-plate wet clutch. The RDU 130 also has a differential gear arrangement 131 for driving respective left and right rear drive shafts 126. The clutch 127 is configured to connect the prop shaft 123 to an input portion of the differential gear arrangement 131. It is to be understood that the controller 140 is configured to cause the vehicle 100 to operate in the two wheel drive mode by controlling the PTU 124 to disconnect the prop shaft 123 from the gearbox 118, and controlling the clutch 127 of the RDU 130 to disconnect the prop shaft 123 from the differential 131. The controller 140 is also configured to cause the vehicle to operate in the four wheel drive mode by controlling the PTU 124 to connect the prop shaft 123 to the gearbox 118, and controlling the clutch 127 of the RDU 130 to connect the prop shaft 123 to the differential 131. In the embodiment of FIG. 5 the PTU 124 has a PTC in the form of a multi-plate wet clutch. In an alternative embodiment the PTC is in the form of a dog clutch, the PTU 124 also having a synchroniser for synchronising the speed of rotation of input and output portions of the PTC when it is required to close the dog clutch.

The driveline 105 of the embodiment of FIG. 5 is not configured to allow cross-axle lock to be applied between rear wheels 114, 115 of the driveline 5. However in some alternative embodiments means may be provided for locking the rear drive shafts 126 together such that relative rotation may be substantially prevented. For example in some embodiments the rear drive shafts 126 may be arranged to be locked together by means of a clutch arrangement.

Figure 6:
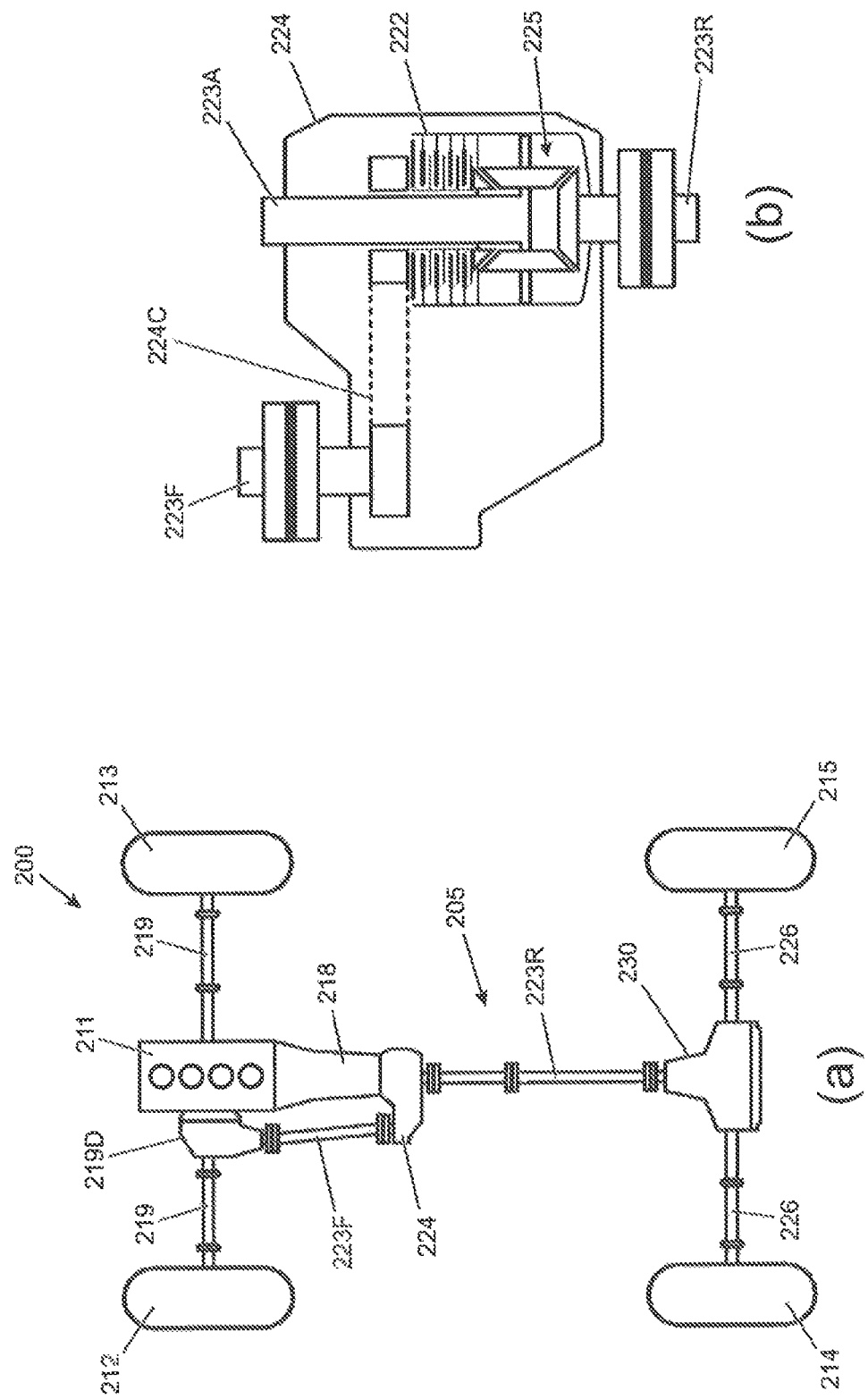
FIG. 6 is a schematic illustration of (a) a vehicle according to a still further embodiment of the present invention and (b) an enlarged view of a portion of the vehicle shown in (a)

FIG. 6(*a*) illustrates a portion of a vehicle 200 according to a further embodiment of the present invention. Like features of the embodiment of FIG. 6 to those of the embodiment of FIG. 1 are shown with like reference signs incremented by 200. FIG. 6(*b*) is an enlarged view of a portion of the driveline 205 of the vehicle 200 shown in (a) and shows detail in respect of PTU 224.

The driveline 205 has a PTU input shaft 223A (FIG. 6(*b*)) that is permanently connected to a gearbox 218, a front prop shaft 223F connectable to the PTU input shaft 223A via a power transfer clutch (PTC) 222 and a rear prop shaft 223R that is connected to the PTU input shaft 223A by means of a differential gear arrangement (or 'differential') 225. In the embodiment shown the differential 225 may be referred to as a 'center differential' or 'center diff' and forms part of the PTU 224. The differential 225 allows the front and rear prop shafts 223F, 223R to rotate at different respective speeds.

The rear prop shaft 223R is connected to an RDU 230 that is configured to allow the rear prop shaft 223R to be connected to and disconnected from rear wheels 214, 215. In the embodiment of FIG. 6 the RDU 230 is similar to RDU 130 of the embodiment of FIG. 5 although other types of RDU may be useful such as RDU 30 of the embodiment of FIG. 1.

The PTC 222 allows the front prop shaft 223F to be releasably connected to the PTU input shaft 223A via a chain drive 224C. The PTC 222 is a multi-plate wet clutch in the embodiment of FIG. 6 although other types of clutch may be useful in some embodiments, such as a dog clutch. The front prop shaft 223F is in turn arranged to drive a pair of front drive shafts 219 via a front differential unit 219D. The front differential unit 219D has a differential gear arrangement that allows the prop shafts 219 to rotate at different respective speeds.

Figure 7:
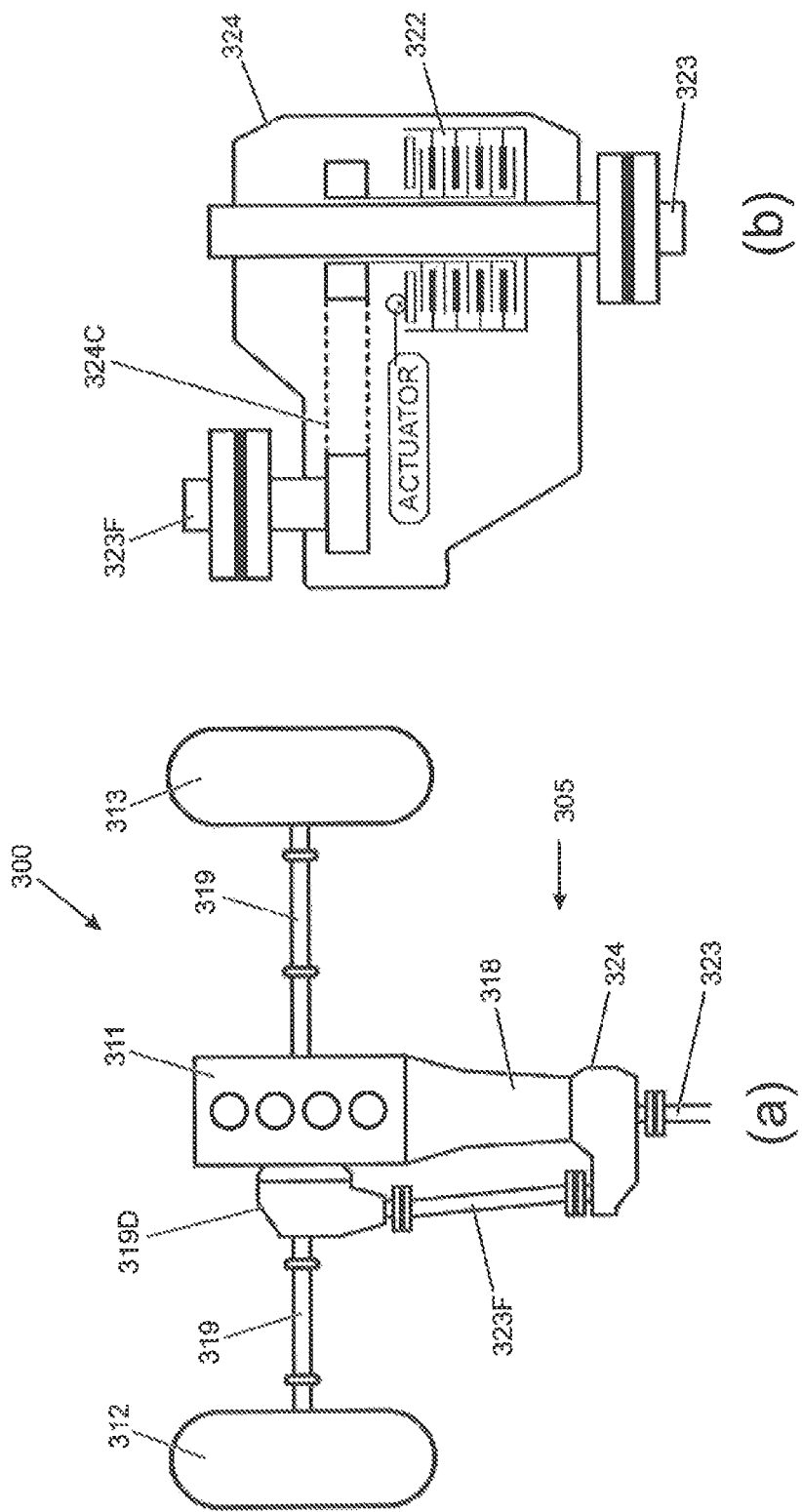
FIG. 7 is a schematic illustration of (a) a vehicle according to an embodiment of the present invention and (b) an enlarged view of a portion of the vehicle shown in (a).

In some embodiments the PTU 224 may be provided without the differential 225. FIG. 7 shows a portion of a driveline 305 having such a PTU. Like features of the embodiment of FIG. 7 to those of the embodiment of FIG. 1 are shown with like reference signs incremented by 300.

In the arrangement of FIG. 7, a single prop shaft 323 connects gearbox 318 and an RDU (not shown). That is, the driveline 305 does not have separate front and rear prop shafts 223F, 223R. A PTC 322 in the form of a multi-plate wet clutch 322 (FIG. 7(b)) is provided that is configured to allow the prop shaft 323 to be connected to a front prop shaft 323F that is arranged in turn to drive a front differential unit 319D. The PTC 322 is arranged to drive the front prop shaft 323F via a chain drive 324C.

Some embodiments of the present invention may be understood by reference to the following numbered paragraphs:

1. A control system configured to control a driveline of a motor vehicle to operate in a selected one of a plurality of configurations, the system being configured to receive a signal indicative of a location of the vehicle, the system being configured to cause the driveline to operate in a configuration selected in dependence at least in part on the signal indicative of the location of the vehicle.

2. A control system according to paragraph 1 configured to cause the driveline to operate in a first configuration in which the driveline is configured such that a first group of one or more wheels and in addition a second group of one or more wheels are arranged to be driven or a second configuration in which the first group of one or more wheels and not the second group are arranged to be driven.

3. A control system according to paragraph 2 configured to cause the driveline to operate in the first configuration if the signal indicative of location indicates the vehicle is operating off-road.

4. A control system according to paragraph 2 configured to cause the driveline to operate in the second configuration if the signal indicative of location indicates the vehicle is operating on-road.

5. A control system according to paragraph 1 configured to predict an amount of lateral acceleration that will be experienced by the vehicle in dependence at least in part on a predicted path of travel of the vehicle, the system being configured to cause the driveline to operate in a predetermined one of the plurality of configurations in dependence at least in part on the predicted amount of lateral acceleration.

6. A control system according to paragraph 2 configured to predict an amount of lateral acceleration that will be experienced by the vehicle in dependence at least in part on a predicted path of travel of the vehicle, the system being configured to cause the driveline to operate in a predetermined one of the plurality of configurations in dependence at least in part on the predicted amount of lateral acceleration, and wherein the first or second group of one or more wheels comprises a plurality of wheels, the system being configured to set a predetermined amount of locking torque between at least a pair of wheels of the plurality of wheels of the first group and/or at least a pair of wheels of the plurality of wheels of the second group in dependence at least in part on the predicted amount of lateral acceleration.

7. A control system according to paragraph 5 configured to cause the driveline to operate in a first configuration in which the driveline is configured such that a first group of one or more wheels and in addition a second group of one or more wheels are arranged to be driven or a second configuration in which the first group of one or more wheels and not the second group are arranged to be driven, the system being further configured to set a predetermined amount of locking torque between at least one wheel of the first group and at least one wheel of the second group in dependence at least in part on the predicted amount of lateral acceleration.

8. A control system according to paragraph 5 configured to determine the amount of lateral acceleration that will be experienced at least in part in dependence on a radius of curvature of the predicted path of travel.

9. A control system according to paragraph 5 configured to compare the predicted amount of lateral acceleration with a threshold lateral acceleration value and to cause the driveline to operate in a predetermined one of the plurality of configurations in dependence at least in part on whether the predicted amount of lateral acceleration exceeds the threshold value.

10. A control system according to paragraph 9 wherein the threshold lateral acceleration value is determined at least in part in dependence on at least one selected from amongst vehicle speed, one or more characteristics of a road wheel of the vehicle and data in respect of one or more environmental conditions.

11. A control system according to paragraph 1 configured to determine whether a bend exists in a predicted path of travel of the vehicle, the system being configured to cause the driveline to operate in a predetermined one of the plurality of configurations in dependence at least in part on whether a bend exists in the predicted path of travel.

12. A control system according to paragraph 11 configured to cause the driveline to operate in a predetermined one of the plurality of configurations in dependence at least in part on whether a bend is detected having a radius of curvature less than a predetermined value.

13. A control system according to paragraph 12 wherein the predetermined value of bend radius is dependent at least in part on a speed of travel of the vehicle.

14. A control system according to paragraph 11 configured to cause the driveline to operate in a first configuration in which the driveline is configured such that a first group of one or more wheels and in addition a second group of one or more wheels are arranged to be driven or a second configuration in which the first group of one or more wheels and not the second group are arranged to be driven, the system being further configured to cause the driveline to operate in the first configuration if it is determined that a bend exists in the predicted path of travel.

15. A control system according to paragraph 14 configured to set an amount of locking torque between wheels of the first group and/or between wheels of the second group, and/or between at least one wheel of the first group and at least one wheel of the second group, at least in part in dependence on whether a bend exists in the predicted path of travel.

16. A control system according to paragraph 11 configured to cause the driveline to operate in a predetermined one of the plurality of configurations in dependence at least in part on whether a bend exists in the predicted path of travel when the vehicle is operating on-road.

17. A control system according to paragraph 1 configured to cause the driveline to operate in a configuration selected at least in part in further dependence on a signal indicative of a selected driving mode in which the vehicle is operating, the driving mode being selected from a plurality of driving modes.

18. A control system according to paragraph 17 wherein the signal indicative of the driving mode in which the vehicle is operating corresponds to a state of a manual driving mode selector input device or a signal indicative of a driving mode selected automatically by an automatic driving mode selector.

19. A control system according paragraph 17 having a subsystem controller for initiating control of at least one vehicle subsystem in a selected one of a plurality of subsystem configuration modes of that system, the subsystem configuration mode being selected in dependence on the selected driving mode.

20. A control system according to paragraph 19 wherein the driving modes correspond to respective different driving conditions for a vehicle.

21. A control system according to paragraph 20 wherein in each driving mode the system is configured to cause the at least one vehicle subsystem to be operated in a subsystem configuration mode appropriate to the driving condition.

22. A control system according to paragraph 17 wherein each driving mode has a corresponding subsystem configuration mode of at least one vehicle subsystem selected from amongst an engine management system, a transmission system, a steering system, a brakes system and a suspension system.

23. A control system according to paragraph 17 wherein the subsystem configuration modes of at least one driving mode are selected from amongst:
  a subsystem configuration mode of a suspension system, the plurality of subsystem configuration modes of the suspension system comprising a plurality of ride heights;
  a subsystem configuration mode of a fluid suspension system in which fluid interconnection can be made between suspensions for wheels on opposite sides of the vehicle, the plurality of subsystem configuration modes of the fluid suspension system providing different levels of said interconnection;
  a subsystem configuration mode of a steering system which can provide steering assistance, the plurality of subsystem configuration modes of the steering system providing different levels of said steering assistance;
  a subsystem configuration mode of a brakes system which can provide braking assistance, the plurality of subsystem configuration modes of the brakes system providing different levels of said braking assistance;
  a subsystem configuration mode of a brake control system which can provide an anti-lock function to control wheel slip, the plurality of subsystem configuration modes of the brake control system allowing different levels of said wheel slip;
  a subsystem configuration mode of a powertrain system which includes a powertrain controller and an accelerator or throttle pedal, the subsystem configuration modes of the powertrain system providing different levels of responsiveness of the powertrain controller to movement of the accelerator or throttle pedal;
  a subsystem configuration mode of a traction control system which is arranged to control wheel spin, the plurality of subsystem configuration modes of the traction control system allowing different levels of said wheel spin;
  a subsystem configuration mode of a yaw control system which is arranged to control vehicle yaw, the plurality of subsystem configuration modes of the yaw control system allowing different levels of divergence of said vehicle yaw from an expected yaw;
  a subsystem configuration mode of a range change transmission, the subsystem configuration modes of the range change transmission including a high range mode and a low range mode of said transmission; and
  a subsystem configuration mode of a transmission system operable in a plurality of transmission ratios and including a transmission controller arranged to monitor at least one parameter of the vehicle and to select the transmission ratios in response, the subsystem configuration modes of the transmission system including a plurality of transmission configuration modes in which the transmission ratios are selected differently in response to said at least one parameter.

24. A driveline in combination with a system according to paragraph 1.

25. A powertrain comprising a driveline and a system according to paragraph 1.

26. A motor vehicle comprising a driveline and a system according to paragraph 1.

27. A motor vehicle comprising a body, a plurality of wheels, a powertrain to drive said wheels, the powertrain comprising a driveline, a braking system to brake said wheels, and a system according to paragraph 1.

28. A method of controlling a driveline of a motor vehicle to operate in a selected one of a plurality of configurations, the method comprising:
  receiving a signal indicative of a location of the vehicle, and
  causing the driveline to operate in a configuration selected in dependence at least in part on the signal indicative of the location of the vehicle.

29. A carrier medium carrying computer readable code for controlling a vehicle to carry out the method of paragraph 28.

30. A computer program product executable on a processor so as to implement the method of paragraph 28.

31. A computer readable medium loaded with the computer program product of paragraph 28.

32. A processor arranged to implement the method of paragraph 28, or the computer program product of paragraph 30.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A control system configured to control a driveline of a motor vehicle to operate in a first configuration in which the driveline is configured such that a first group of one or more wheels and in addition a second group of one or more wheels are arranged to be driven or a second configuration in which the first group of one or more wheels and not the second group are arranged to be driven, the control system comprising:
receiver means operable to receive a location signal indicative of a location of the vehicle,
means to determine a predicted path of travel of the vehicle using the location signal,
means to predict an amount of lateral acceleration that will be experienced by the vehicle in dependence at least in part on the predicted path of travel of the vehicle,
a comparator operable to compare the predicted amount of lateral acceleration with a threshold lateral acceleration value, and
a controller operable to cause the driveline to operate in either the first or the second configuration in dependence at least in part on whether the predicted amount of lateral acceleration exceeds the threshold lateral acceleration value,
wherein the first or the second group of one or more wheels comprises a plurality of wheels, the system being configured to set a predetermined amount of locking torque between at least two wheels of at least one of the first group and the second group in dependence at least in part on the predicted amount of lateral acceleration.

2. The control system according to claim 1 wherein if the predicted amount of lateral acceleration exceeds the threshold lateral acceleration value the controller causes the driveline to operate in the first configuration and if the predicted amount of lateral acceleration is below the threshold lateral acceleration value the controller causes the driveline to operate in the second configuration.

3. The control system according to claim 1, wherein the means to determine the predicted path of travel of the vehicle is configured to determine whether a bend exists in the predicted path of travel of the vehicle, and the controller is configured to cause the driveline to operate in a predetermined one of the first or second configuration in dependence at least in part on whether a bend exists in the predicted path of travel.

4. The control system according to claim 3, wherein the controller is configured to cause the driveline to operate in a predetermined one of the first or second configuration in dependence at least in part on whether a bend is detected having a radius of curvature less than a predetermined value.

5. A control system configured to control a driveline of a motor vehicle to operate in a first configuration in which the driveline is configured such that a first group of one or more wheels and in addition a second group of one or more wheels are arranged to be driven or a second configuration in which the first group of one or more wheels and not the second group are arranged to be driven, the control system comprising:
receiver means operable to receive a location signal indicative of a location of the vehicle;
means to determine whether a bend exists in a predicted path of travel of the vehicle, the predicted path of travel of the vehicle being determined using the location signal;
means to determine the radius of the bend;
a comparator operable to determine whether the radius of the bend has a curvature less than a predetermined value; and
a controller operable to cause the driveline to operate in either the first or the second configuration in dependence at least in part on whether the radius of the bend has a curvature less than the predetermined value,
wherein the control system is configured to predict an amount of lateral acceleration that will be experienced by the vehicle in dependence at least in part on the predicted path of travel of the vehicle,
the controller being configured to cause the driveline to operate in a predetermined one of the first or second configuration in dependence at least in part on the predicted amount of lateral acceleration, and
wherein the first or second group of one or more wheels comprises a plurality of wheels,
the system being configured to set a predetermined amount of locking torque between at least two wheels of at least one of the first group and the second group in dependence at least in part on the predicted amount of lateral acceleration.

6. The control system according to claim 5 wherein if the predicted amount of lateral acceleration exceeds a threshold value the controller causes the driveline to operate in the first configuration and if the predicted amount of lateral acceleration is below the threshold value the controller causes the driveline to operate in the second configuration.

7. The control system according to claim 1 configured to set a predetermined amount of locking torque between at least one wheel of the first group and at least one wheel of the second group in dependence at least in part on the predicted amount of lateral acceleration.

8. The control system according to claim 1 configured to determine the amount of lateral acceleration that will be experienced at least in part in dependence on a radius of curvature of the predicted path of travel.

9. The control system according to claim 1 wherein the threshold lateral acceleration value is determined at least in part in dependence on at least one selected from amongst vehicle speed, one or more characteristics of a road wheel of the vehicle and data in respect of one or more environmental conditions.

10. The control system according to claim 5 wherein the predetermined value is dependent at least in part on a speed of travel of the vehicle.

11. The control system according to claim 5 configured to set an amount of locking torque between selected ones of the wheels, at least in part in dependence on whether a bend exists in the predicted path of travel.

12. The control system according to claim 5 wherein the controller is configured to cause the driveline to operate in a predetermined one of the first or second configuration in dependence at least in part on whether a bend exists in the predicted path of travel when the vehicle is operating on-road.

13. The control system according to claim 1 wherein the controller is configured to cause the driveline to operate in the first configuration if the signal indicative of location indicates the vehicle is operating off-road and to cause the driveline to operate in the second configuration if the signal indicative of location indicates the vehicle is operating on-road.

14. The control system according to claim 1 wherein the controller is configured to cause the driveline to operate in a configuration selected at least in part in further dependence on a signal indicative of a selected driving mode in which the vehicle is operating, the driving mode being selected from a plurality of driving modes.

15. The control system according to claim 14 wherein the signal indicative of the selected driving mode in which the vehicle is operating corresponds to a state of a manual driving mode selector input device or a signal indicative of the selected driving mode selected automatically by automatic driving mode selection means.

16. The control system according to claim 14 having a subsystem controller for initiating control of at least one vehicle subsystem in a selected one of a plurality of subsystem configuration modes, the subsystem configuration mode being selected in dependence on the selected driving mode.

17. The control system according to claim 16 wherein the driving modes correspond to respective different driving conditions for a vehicle.

18. The control system according to claim 17 wherein in each driving mode the system is configured to cause the at least one vehicle subsystem to be operated in one of the subsystem configuration modes appropriate to the driving condition.

19. The control system according to claim 14 wherein each driving mode has a corresponding subsystem configuration mode of at least one vehicle subsystem selected from amongst an engine management system, a transmission system, a steering system, a brakes system and a suspension system.

20. The control system according to claim 16 wherein the selected one of the subsystem configuration modes is selected from amongst:
a subsystem configuration mode of a suspension system, the plurality of subsystem configuration modes of the suspension system comprising a plurality of ride heights;
a subsystem configuration mode of a fluid suspension system in which fluid interconnection can be made between suspensions for wheels on opposite sides of the vehicle, the plurality of subsystem configuration modes of the fluid suspension system providing different levels of said interconnection;
a subsystem configuration mode of a steering system which can provide steering assistance, the plurality of subsystem configuration modes of the steering system providing different levels of said steering assistance;
a subsystem configuration mode of a brakes system which can provide braking assistance, the plurality of subsystem configuration modes of the brakes system providing different levels of said braking assistance;
a subsystem configuration mode of a brake control system which can provide an anti-lock function to control wheel slip, the plurality of subsystem configuration modes of the brake control system allowing different levels of said wheel slip;
a subsystem configuration mode of a powertrain system which includes a powertrain control means and an accelerator or throttle pedal, the subsystem configuration modes of the powertrain system providing different levels of responsiveness of the powertrain control means to movement of the accelerator or throttle pedal;
a subsystem configuration mode of a traction control system which is arranged to control wheel spin, the plurality of subsystem configuration modes of the traction control system allowing different levels of said wheel spin;
a subsystem configuration mode of a yaw control system which is arranged to control vehicle yaw, the plurality of subsystem configuration modes of the yaw control system allowing different levels of divergence of said vehicle yaw from an expected yaw;
a subsystem configuration mode of a range change transmission, the subsystem configuration modes of the range change transmission including a high range mode and a low range mode of said transmission; and
a subsystem configuration mode of a transmission system operable in a plurality of transmission ratios and including a transmission control means arranged to monitor at least one parameter of the vehicle and to select the transmission ratios in response, the plurality of subsystem configuration modes of the transmission system including a plurality of transmission configuration modes in which the transmission ratios are selected differently in response to said at least one parameter.

* * * * *